United States Patent
Lim

(10) Patent No.: US 9,013,443 B2
(45) Date of Patent: Apr. 21, 2015

(54) TOUCH PANEL AND DRIVING DEVICE FOR THE SAME

(75) Inventor: Seong-Taek Lim, Suwon-si (KR)

(73) Assignee: Samsung Electronics Co., Ltd., Suwon-si (KR)

(*) Notice: Subject to any disclaimer, the term of this patent is extended or adjusted under 35 U.S.C. 154(b) by 368 days.

(21) Appl. No.: 13/224,422

(22) Filed: Sep. 2, 2011

(65) Prior Publication Data

US 2012/0262410 A1    Oct. 18, 2012

(30) Foreign Application Priority Data

Apr. 18, 2011    (KR) .......................... 10-2011-0035875

(51) Int. Cl.
  *G06F 3/045* (2006.01)
  *G06F 3/041* (2006.01)
  *G06F 3/044* (2006.01)

(52) U.S. Cl.
  CPC .............. *G06F 3/0416* (2013.01); *G06F 3/044* (2013.01)

(58) Field of Classification Search
  USPC ..................... 345/173–182; 178/18.01–18.11
  See application file for complete search history.

(56) References Cited

U.S. PATENT DOCUMENTS

| | | | |
|---|---|---|---|
| 4,923,057 A | 5/1990 | Carlson et al. | |
| 4,963,417 A | 10/1990 | Taniguchi et al. | |
| 5,055,840 A | 10/1991 | Bartlett et al. | |
| 5,222,895 A | 6/1993 | Fricke | |
| 5,856,822 A | 1/1999 | Du et al. | |
| 5,977,867 A | 11/1999 | Blouin | |
| 6,118,435 A | 9/2000 | Fujita et al. | |
| 6,278,439 B1 | 8/2001 | Rosenberg et al. | |
| 6,317,116 B1 | 11/2001 | Rosenberg et al. | |
| 6,429,846 B2 | 8/2002 | Rosenberg et al. | |
| 6,809,462 B2 | 10/2004 | Pelrine et al. | |
| 7,051,292 B2 | 5/2006 | Nagase | |
| 7,067,756 B2 | 6/2006 | Cok | |
| 7,131,073 B2 | 10/2006 | Rosenberg et al. | |
| 7,196,688 B2 | 3/2007 | Schena | |
| 7,202,837 B2 | 4/2007 | Ihara | |
| 7,268,770 B1 | 9/2007 | Takahata et al. | |
| 7,339,572 B2 | 3/2008 | Schena | |

(Continued)

FOREIGN PATENT DOCUMENTS

| | | |
|---|---|---|
| CN | 1678978 A | 10/2005 |
| CN | 1829951 A | 9/2006 |

(Continued)

OTHER PUBLICATIONS

Extended European search report dated Oct. 7, 2010 issued by the European Patent Office in counterpart European Application No. 10166013.2.

(Continued)

*Primary Examiner* — Kenneth B Lee, Jr.
(74) *Attorney, Agent, or Firm* — Sughrue Mion, PLLC

(57) ABSTRACT

A driving device and a touch panel are provided. The driving device includes a first switcher and a second switcher. The first switcher is coupled to a first electrode of a capacitance node of the touch panel and is configured to selectively apply, to the first electrode, a driving voltage for generating an electric potential difference in the capacitance node. The second switcher is coupled to the first electrode and configured to selectively apply, to the first electrode, a sensing voltage for sensing a variation in the capacitance of the at least one capacitance node.

18 Claims, 19 Drawing Sheets

(56) References Cited

U.S. PATENT DOCUMENTS

| | | |
|---|---|---|
| 7,342,573 B2 | 3/2008 | Ryynaenen et al. |
| 7,436,396 B2 | 10/2008 | Akieda et al. |
| 7,477,242 B2 | 1/2009 | Cross et al. |
| 7,511,706 B2 | 3/2009 | Schena |
| 7,589,714 B2 | 9/2009 | Funaki |
| 7,598,949 B2 | 10/2009 | Han |
| 7,608,976 B1 | 10/2009 | Cheng et al. |
| 7,679,611 B2 | 3/2010 | Schena |
| 7,688,080 B2 | 3/2010 | Golovchenko et al. |
| 7,719,167 B2 | 5/2010 | Kwon et al. |
| 8,164,573 B2 | 4/2012 | DaCosta et al. |
| 8,345,013 B2 | 1/2013 | Heubel et al. |
| 8,493,131 B2 | 7/2013 | Mo et al. |
| 8,581,866 B2 | 11/2013 | Park et al. |
| 2001/0026636 A1 | 10/2001 | Mainguet |
| 2001/0035854 A1 | 11/2001 | Rosenberg et al. |
| 2002/0033795 A1 | 3/2002 | Shahoian et al. |
| 2002/0039620 A1 | 4/2002 | Shahinpoor et al. |
| 2002/0101410 A1 | 8/2002 | Sakata et al. |
| 2003/0016849 A1 | 1/2003 | Andrade |
| 2004/0090426 A1 | 5/2004 | Bourdelais et al. |
| 2005/0057528 A1 | 3/2005 | Kleen |
| 2005/0076824 A1 | 4/2005 | Cross et al. |
| 2005/0130604 A1 | 6/2005 | Chipchase et al. |
| 2005/0200286 A1 | 9/2005 | Stoschek et al. |
| 2005/0285846 A1 | 12/2005 | Funaki |
| 2006/0097991 A1 | 5/2006 | Hotelling et al. |
| 2006/0099808 A1 | 5/2006 | Kondo |
| 2006/0103634 A1 | 5/2006 | Kim et al. |
| 2006/0119589 A1 | 6/2006 | Rosenberg et al. |
| 2007/0080951 A1 | 4/2007 | Maruyama et al. |
| 2007/0152974 A1 | 7/2007 | Kim et al. |
| 2007/0152982 A1 | 7/2007 | Kim et al. |
| 2007/0182718 A1 | 8/2007 | Schoener et al. |
| 2007/0211032 A1 | 9/2007 | Ahn et al. |
| 2007/0229464 A1 | 10/2007 | Hotelling et al. |
| 2008/0007815 A1 | 1/2008 | Liang et al. |
| 2008/0024459 A1 | 1/2008 | Poupyrev et al. |
| 2008/0024461 A1 | 1/2008 | Richter et al. |
| 2008/0036746 A1 | 2/2008 | Klinghult |
| 2008/0100590 A1 | 5/2008 | Hur et al. |
| 2008/0111788 A1 | 5/2008 | Rosenberg et al. |
| 2008/0143689 A1 | 6/2008 | Foo et al. |
| 2008/0158169 A1 | 7/2008 | O'Connor et al. |
| 2008/0165134 A1 | 7/2008 | Krah |
| 2008/0165158 A1 | 7/2008 | Hotelling et al. |
| 2008/0284277 A1 | 11/2008 | Kwon et al. |
| 2009/0002199 A1 | 1/2009 | Lainonen et al. |
| 2009/0002328 A1 | 1/2009 | Ullrich et al. |
| 2009/0046065 A1 | 2/2009 | Liu et al. |
| 2009/0046068 A1 | 2/2009 | Griffin |
| 2009/0075694 A1 | 3/2009 | Kim et al. |
| 2009/0085878 A1 | 4/2009 | Heubel et al. |
| 2009/0182501 A1 | 7/2009 | Fyke et al. |
| 2009/0231305 A1 | 9/2009 | Hotelling et al. |
| 2009/0308737 A1 | 12/2009 | Kudoh |
| 2010/0024573 A1 | 2/2010 | Daverman et al. |
| 2010/0026654 A1 | 2/2010 | Suddreth |
| 2010/0026655 A1 | 2/2010 | Harley et al. |
| 2010/0059295 A1* | 3/2010 | Hotelling et al. .......... 178/18.06 |
| 2010/0060610 A1* | 3/2010 | Wu ................................ 345/174 |
| 2010/0149108 A1 | 6/2010 | Hotelling et al. |
| 2010/0156829 A1 | 6/2010 | Shimodaira |
| 2010/0177050 A1 | 7/2010 | Heubel et al. |
| 2010/0214232 A1 | 8/2010 | Chan et al. |
| 2010/0244858 A1 | 9/2010 | Cormier, Jr. |
| 2010/0259485 A1 | 10/2010 | Chuang |
| 2010/0321330 A1 | 12/2010 | Lim et al. |
| 2010/0321335 A1* | 12/2010 | Lim et al. ...................... 345/174 |
| 2011/0057899 A1 | 3/2011 | Sleeman et al. |
| 2011/0163978 A1 | 7/2011 | Park et al. |
| 2011/0181530 A1 | 7/2011 | Park et al. |
| 2011/0227862 A1 | 9/2011 | Lim |
| 2011/0279374 A1 | 11/2011 | Park et al. |
| 2012/0019467 A1 | 1/2012 | Hotelling et al. |
| 2012/0038563 A1 | 2/2012 | Park et al. |
| 2012/0086651 A1 | 4/2012 | Kwon et al. |
| 2012/0127122 A1 | 5/2012 | Lim |
| 2012/0262410 A1 | 10/2012 | Lim |

FOREIGN PATENT DOCUMENTS

| | | |
|---|---|---|
| CN | 101046720 A | 10/2007 |
| CN | 101510008 A | 8/2009 |
| CN | 101840296 A | 9/2010 |
| EP | 1 544 720 A1 | 6/2005 |
| EP | 2 026 178 A1 | 2/2009 |
| EP | 2 141 569 A2 | 1/2010 |
| EP | 2 079 052 B1 | 3/2011 |
| JP | 6-34940 A | 2/1994 |
| JP | 09-319509 A | 12/1997 |
| JP | 11-203025 A | 7/1999 |
| JP | 11-273501 A | 10/1999 |
| JP | 2000-066782 A | 3/2000 |
| JP | 2001-282433 A | 10/2001 |
| JP | 2002-157087 A | 5/2002 |
| JP | 2002-236550 A | 8/2002 |
| JP | 2002-342035 A | 11/2002 |
| JP | 2004-71765 A | 3/2004 |
| JP | 2004-362428 A | 12/2004 |
| JP | 2005-107804 A | 4/2005 |
| JP | 2005-135876 A | 5/2005 |
| JP | 2005-275632 A | 10/2005 |
| JP | 2006-011646 A | 1/2006 |
| JP | 2006-146611 A | 6/2006 |
| JP | 2007-513392 A | 5/2007 |
| JP | 2008-33739 A | 2/2008 |
| JP | 2008-257748 A | 10/2008 |
| JP | 2010-016969 A | 1/2010 |
| JP | 2010-79882 A | 4/2010 |
| JP | 2010-108505 A | 5/2010 |
| JP | 2011-3177 A | 1/2011 |
| JP | 2012-500089 A | 1/2012 |
| KR | 91-14838 A | 8/1991 |
| KR | 10-2001-0054523 A | 7/2001 |
| KR | 10-2004-0058731 A | 7/2004 |
| KR | 10-2005-0029285 A | 3/2005 |
| KR | 10-2006-0053769 A | 5/2006 |
| KR | 10-2006-0075135 A | 7/2006 |
| KR | 10-2006-0118640 A | 11/2006 |
| KR | 10-2006-0125544 A | 12/2006 |
| KR | 10-2007-0011524 A | 1/2007 |
| KR | 10-2007-0070897 A | 7/2007 |
| KR | 10-2007-0093251 A | 9/2007 |
| KR | 10-2008-0061047 A | 7/2008 |
| KR | 10-2008-0100757 A | 11/2008 |
| KR | 10-0877067 B1 | 1/2009 |
| KR | 10-2009-0011367 A | 2/2009 |
| KR | 10-2009-0029520 A | 3/2009 |
| KR | 10-0901381 B1 | 6/2009 |
| KR | 10-2009-0087351 A | 8/2009 |
| KR | 10-2009-0101292 A | 9/2009 |
| KR | 10-2009-0126760 A | 12/2009 |
| KR | 10-2010-0011368 A | 2/2010 |
| KR | 10-2010-0020065 A | 2/2010 |
| KR | 10-2010-0136759 A | 12/2010 |
| WO | 02/089038 A2 | 11/2002 |
| WO | 03/050754 A1 | 6/2003 |
| WO | 2004/014115 A1 | 2/2004 |
| WO | 2004/053909 A1 | 6/2004 |
| WO | 2004/106099 A1 | 12/2004 |
| WO | 2005/010735 A1 | 2/2005 |
| WO | 2005/091257 A1 | 9/2005 |
| WO | 2008/037275 A1 | 4/2008 |
| WO | 2009/002605 A1 | 12/2008 |
| WO | 2010105705 A1 | 9/2010 |

OTHER PUBLICATIONS

Non-Final US Office Action, dated Mar. 15, 2013, issued in U.S. Appl. No. 12/889,800.

Non-Final US Office Action, dated May 7, 2013, issued in U.S. Appl. No. 12/719,281.

(56) References Cited

OTHER PUBLICATIONS

European Communication, dated Mar. 19, 2013, issued in European Application No. 11150285.2.
Non-Final US Election Requirement, dated Apr. 10, 2013, issued in U.S. Appl. No. 13/097,937.
Non-Final US Office Action, dated Apr. 22, 2013, issued in U.S. Appl. No. 13/050,550.
Non-Final US Office Action, dated Feb. 1, 2013, issued in U.S. Appl. No. 13/103,221.
Non-Final US Office Action, dated Oct. 15, 2012, issued in U.S. Appl. No. 12/948,479.
Final US Office Action, dated Mar. 27, 2013, issued in U.S. Appl. No. 12/948,479.
Non-Final US Office Action, dated Aug. 28, 2012, issued in U.S. Appl. No. 12/849,310.
Final US Office Action, dated Dec. 20, 2012, issued in U.S. Appl. No. 12/849,310.
US Advisory Action, dated Apr. 26, 2013, issued in U.S. Appl. No. 12/849,310.
Notice of Allowance, dated Jan. 22, 2014, issued by the USPTO in related U.S. Appl. No. 12/780,996.
Non-Final Office Action, dated Feb. 10, 2014, issued by the USPTO in related U.S. Appl. No. 12/719,281.
Communication dated Oct. 10, 2013 issued by the State Intellectual Property Office of P.R. China in counterpart Chinese Application No. 201010200349.1.
Final Office Action dated Nov. 22, 2013 issued by the United States Patent and Trademark Office in counterpart U.S. Appl. No. 12/849,310.
Final Office Action dated Dec. 5, 2013 issued by the United States Patent and Trademark Office in counterpart U.S. Appl. No. 13/050,550.
Non-Final Office Action dated Dec. 6, 2013 issued by the United States Patent and Trademark Office in counterpart U.S. Appl. No. 13/190,120.
Non-Final Office Action dated Jun. 20, 2013 issued by the United States Patent and Trademark Office in counterpart U.S. Appl. No. 12/780,996.
Non-Final Office Action dated Jul. 17, 2013 issued by the United States Patent and Trademark Office in counterpart U.S. Appl. No. 13/097,937.
Non-Final Office Action dated Jul. 8, 2013 issued by the United States Patent and Trademark Office in counterpart U.S. Appl. No. 12/849,310.
Non-Final Office Action dated Aug. 16, 2013 issued by the United States Patent and Trademark Office in counterpart U.S. Appl. No. 12/889,800.
Notice of Allowance dated Oct. 25, 2013 issued by the United States Patent and Trademark Office in counterpart U.S. Appl. No. 12/780,996.
Notice of Allowance dated Sep. 19, 2013 issued by the United States Patent and Trademark Office in counterpart U.S. Appl. No. 12/719,281.
Communication, dated Mar. 4, 2014, issued by the Japanese Patent Office in counterpart Japanese Patent Application No. 2010-133879.
Notice of Allowance, dated Mar. 28, 2014, issued in related US Application No. 12/849,310.
Final US Office Action, dated Apr. 3, 2014, issued in related US Application No. 12/889,800.
Final US Office Action, dated Mar. 7, 2014, issued in related US Application No. 13/097,937.
Communication issued Oct. 29, 2014, by the State Intellectual Property Office of P.R. China in related Application No. 201010280797.7.
Communication issued Sep. 30, 2014, by the Japanese Patent Office in related Application No. 2010-265704.
Communication issued Oct. 8, 2014, by the State Intellectual Property Office of P.R. China in related Application No. 201010609836.3.
Communication issued Oct. 16, 2014, by the European Patent Office in related Application No. 11186005.2.

\* cited by examiner

TOUCH PANEL AND DRIVING DEVICE FOR THE SAME

CROSS-REFERENCE TO RELATED APPLICATION

This application claims priority from Korean Patent Application No. 10-2011-0035875, filed on Apr. 18, 2011, in the Korean Intellectual Property Office, the entire disclosure of which is incorporated by reference herein for all purposes.

BACKGROUND

1. Field

Apparatuses and devices consistent with the following description relate to an input device, and more particularly, a touch panel.

2. Description of the Related Art

Touch panels are one example of a type of input device that determines whether an input of a user has been received and detects the location of the input by sensing any touch thereon. A user may input data or signals to a touch panel by touching or pressing on the touch panel using a finger or a stylus pen, or the like. For example, a touch panels may be used in place of a mouse as a touch pad for a laptop computer or a netbook, or may be used in place of input switches for an electronic device. A touch panel may be formed in one body with a display. A touch panel installed on the display surface of a display such as a liquid crystal display (LCD), a plasma display panel (PDP), a cathode ray tube (CRT) or the like is generally referred to as a touch screen. A touch screen may be incorporated into a display as a display surface or may be additionally attached onto the display surface of a display.

In certain situations, touch panels may replace existing mechanical user input devices such as a keyboard, trackball, or mouse and also may allow for simple manipulations. Moreover, touch panels can provide various types of input buttons according to the types of application and/or over the course of the execution of applications. Touch panels have been widely used as input devices for various electronic devices such as an automated teller machine (ATM), an information trader, a ticket vending machine, a mobile phone, a personal digital assistant (PDA), a portable multimedia player (PMP), a digital camera, a portable games, a MP3 player, and the like.

Touch panels may be classified into resistive film-type touch panels, capacitive-type touch panels, ultrasonic-type touch panels, infrared-type touch panels, and the like. Each of these types of touch panels has its own advantages and disadvantages, and may be selectively used according to the purpose of use thereof or the types of applications. Touch panels capable of recognizing multi-touch inputs have been developed and have been widely employed in various portable electronic devices.

However, related art touch panels do not provide a sense of input similar to the sense that can be felt upon pressing a mechanical keypad. To provide a sense of input, a vibration motor may be installed below a touch panel. In this case, in response to an input being detected, the whole touch panel may be vibrated by the vibration motor. However, this type of vibration is still different from a sense of input that can be provided by a mechanical keypad.

SUMMARY

According to an aspect of an embodiment, there is provided a driving device for a touch panel having at least one capacitance node, the driving device including a first switching element coupled to a first electrode of the at least one capacitance node and configured to selectively apply, to the first electrode, a driving voltage for generating an electric potential difference in the at least one capacitance node; and a second switching element coupled to the first electrode and configured to selectively apply, to the first electrode, a sensing voltage for sensing a variation in the capacitance of the at least one capacitance node.

According to an aspect of another embodiment, there is provided a touch panel, including a first substrate; a plurality of first electrode lines that are configured to be disposed on the first substrate and that extends in parallel in a first direction; a second substrate configured to be spaced apart from the first substrate by a distance; a plurality of second electrode lines that are configured to be disposed on the second substrate and that extends in parallel in a second direction that is perpendicular to the first direction; an electrorheological fluid configured to be interposed between the first and second substrates; a driving device configured to apply, to the one or more of the first electrode lines, a combined signal obtained by combining a driving voltage for varying the viscosity of the electrorheological fluid with a sensing voltage; and a sensing device configured to be connected to the second electrode lines and detect an input to the touch panel in response to the sensing voltage being applied to the one or more of the first electrode lines, wherein the driving device comprises a first switching element configured to selectively apply the driving voltage to the one or more of the first electrode lines and a second switching element configured to selectively apply the sensing voltage to the one or more of the first electrode lines.

According to an aspect of another embodiment, there is provided a capacitive-type touch panel comprising a first substrate; a first electrode disposed on the first substrate; a second substrate that is spaced apart from the first substrate; a second electrode disposed on the second substrate, the second electrode and the first electrode forming a capacitance node; an electrorheological fluid interposed between the first and second substrates; a driving device coupled to the first electrode and able to apply to the first electrode, a zero voltage, a driving voltage, a sensing voltage, or a combination of the driving voltage and sensing voltage; a sensing device coupled to the second electrode and configured to detect an input at the capacitance node in response to the sensing voltage being applied to the second electrode; and a controller configured to transmit a control signal to the driving device, wherein the driving device selectively applies, to the first electrode, based on the control signal from the controller, the zero voltage, the driving voltage, the sensing voltage, or the combination of the driving voltage and the sensing voltage generated by subtracting the sensing voltage from the driving voltage.

BRIEF DESCRIPTION OF THE DRAWINGS

The above and/or other aspects will be more apparent from the following detailed description of embodiments taken with reference to the accompanying drawings, in which.

DETAILED DESCRIPTION

Figure 1:
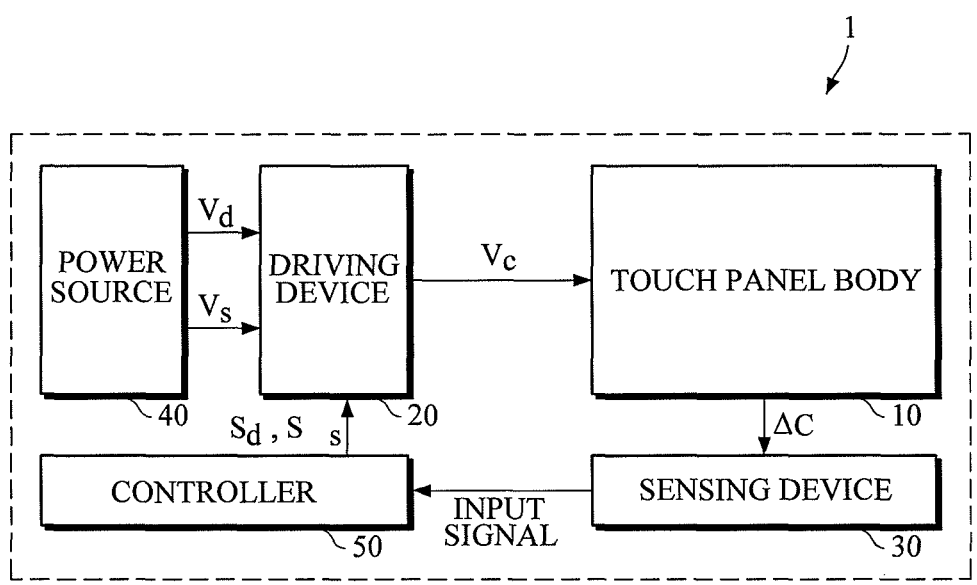
FIG. 1 is a diagram illustrating an example of a touch panel according to an embodiment.

The following description is provided to assist the reader in gaining a comprehensive understanding of the methods, apparatuses, and/or systems described herein. Accordingly, various changes, modifications, and equivalents of the methods, apparatuses, and/or systems described herein may be suggested to those of ordinary skill in the art. Also, descriptions of well-known functions and constructions may be omitted for increased clarity and conciseness.

Throughout the drawings and the detailed description, unless otherwise described, the same drawing reference numerals should be understood to refer to the same elements, features, and structures. The relative size and depiction of these elements may be exaggerated for clarity, illustration, and convenience.

In this detailed description, a touch panel is one example of a kind of user input device and may be mounted onto various devices. For example, the touch panel may be used as a touch pad for a notebook, a netbook or the like and also may be used as an input device in various kinds of home appliances or office electronic equipment, etc. Also, the touch panel may be used as a touch screen for a display of an electronic device, for example, as an input device of an electronic device, such as a mobile phone, a personal digital assistant (PDA), a portable multimedia player (PMP), an E-book terminal, a portable computer, an automated teller machine (ATM), an information trader, a ticket vending machine, or the like.

FIG. 1 illustrates an example of a touch panel, and particularly, an example of a mutual-capacitive-type touch panel that uses an electrorheological fluid. The mutual capacitive-type touch panel may have a pattern. The mutual capacitive-type touch panel may include a plurality of capacitance nodes that are arranged in the form of a matrix, and may detect an input based on any variation in the capacitance of each of the capacitance nodes. The mutual capacitive-type touch panel may use the properties of an electrorheological fluid whose viscosity increases according to the difference in potential between the capacitance nodes.

An example of a touch panel is further described with reference to FIG. 1.

Referring to FIG. 1, touch panel 1 may include a touch panel body 10, a driving device 20, and a sensing device 30. The touch panel 1 may also include a power source 40 and a controller 50. The touch panel body 10 may indicate a physical structure that forms the touch panel 1. The driving device 20, the sensing device 30, the power source 40, and the controller 50 may be implemented as electrical circuits and/or a combination of hardware and software, or only software for controlling the operation of the touch panel body 10. The term "touch panel," as used herein, may indicate simply the touch panel body 10 in a narrow sense, but may also indicate, in a broad sense, the entire touch panel 1 including the driving device 20, the sensing device 30, the power source 40, and/or the controller 50.

The driving device 20, the sensing device 30, the power source 40, and the controller 50 may not necessarily be physically separate units, and may simply be distinguished only logically by their functions. Two or more of the driving device 20, the sensing device 30, the power source 40, and the controller 50 may be integrated into a single unit, or may be implemented as separate units. The distinctions between the driving device 20, the sensing device 30, the power source 40, and the controller 50 are merely for the convenience of description. For example, one of the driving device 20, the sensing device 30, the power source 40, and the controller 50, e.g., the controller 50, may be configured to perform all or at least some of the functions of the driving device 20, the sensing device 30, and the power source 40. In the case that only some of the functions are performed by the controller 50, the remaining functions may be performed by some other component. The structure and operation of the touch panel body 10 are further described with reference to FIG. 2.

Figure 2:
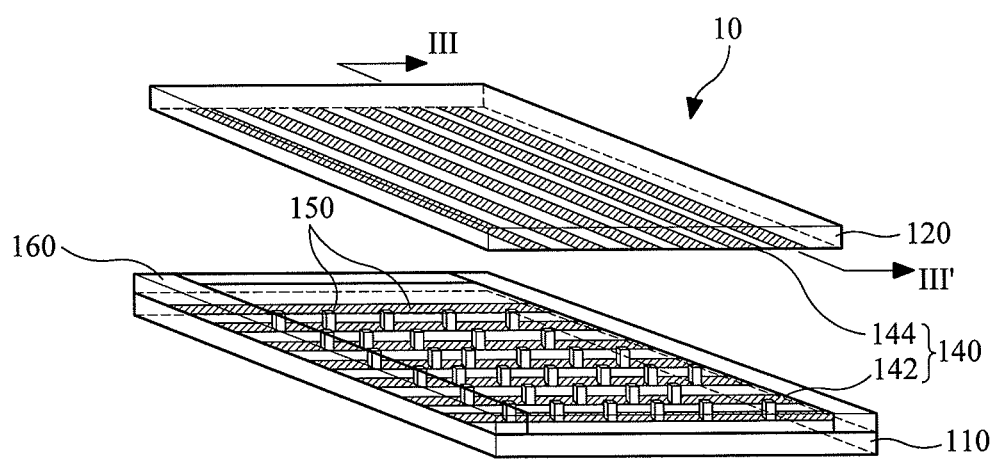
FIG. 2 is a diagram illustrating an example of a touch panel body of the touch panel illustrated in FIG. 1.
Figure 3:
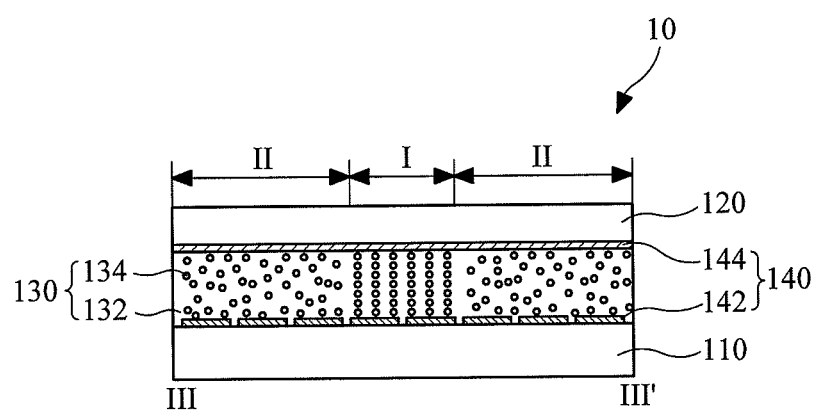
FIG. 3 is a cross-sectional view taken along line III-III' of FIG. 2.

FIG. 2 is an exploded perspective view of an example of the touch panel body 10 of the touch panel 1 illustrated in FIG. 1, and FIG. 3 is a cross-sectional view taken along line III-III' of FIG. 2. Referring to FIGS. 2 and 3, the touch panel body 10 may include a lower substrate 110 and an upper substrate 120, an electrorheological fluid 130 that fills in the gap between the lower substrate 110 and the upper substrate 120 and is sealed, and a plurality of electrode pairs 140.

The lower substrate 110 may be a base substrate of the touch panel body 10, and may allow the touch panel body 10 to serve as a container for the electrorheological fluid 130. In a case in which the touch panel 1 is a touch screen of an electronic device, the lower substrate 110 may form a display surface of the electronic device or may be a substrate additionally attached onto the display surface of the electronic device. The lower substrate 110 may be configured not to be deformed even when attraction force or repulsive force is applied between the lower substrate 110 and the upper substrate 120. The lower substrate 110 may be formed of a rigid material. For example, the lower substrate 110 may be a glass substrate formed of transparent glass. However, there may be situations in which it is advantageous for the lower substrate 110 to be made of a material that is not a hard material. Thus, for example, in these situations, the lower substrate 110 may be formed of a non-rigid material such as a transparent polymer film. In this example, the lower substrate 110 may be attached onto the top surface of a rigid display.

The top surface of the upper substrate 120 may be a touch surface, and may be contacted to enter an input. In response to a force being applied to the upper substrate 120, the upper substrate 120 may be deformed. For example, in response to the user touching or pressing the user touch surface with a finger, a stylus pen or the like, the upper substrate 120 may be deformed. The upper substrate 120 may be formed of a transparent, deformable polymer film or the like. There is no specific restriction on the type of polymer that can be used to fabricate the upper substrate 120. The upper substrate 120 may be spaced a distance apart from the lower substrate 110, and a gap with a height may be formed between the lower substrate 110 and the upper substrate 120. The height of the gap may vary according to a driving voltage $V_d$, the width of the touch panel body 10, the cross-sectional area of each of the electrode pairs 140, and the like.

The gap between the lower substrate 110 and the upper substrate 120 may be filled with the electrorheological fluid 130. The electrorheological fluid 130 may be hermetically sealed using a sealant 160 that is applied along facing edge portions of one or both of the lower substrate 110 and the upper substrate 120. The electrorheological fluid 130 may be a suspension in which fine particles 134 are dispersed in an electro-insulative fluid 132. The viscosity of the electrorheological fluid 130 may considerably increase by a factor of up to about 100,000 in response to an electric field being applied to the electrorheological fluid 130. In response to an electric field no longer being applied to the electrorheological fluid 130, the electrorheological fluid 130 may return to its original viscosity level because such variation in the viscosity of the electrorheological fluid 130 is reversible.

The electrorheological fluid 130 may be, but is not limited to, a transparent liquid. For example, the electro-insulative fluid 132 may be silicon oil, kerosene mineral oil, olefin (PCBs), or the like. The particles 134 included in the electro-insulative fluid 132 may be minute, transparent or opaque particles having a size of up to about 50 µm. The particles 134 may be formed of a polymer such as aluminosilicate, polyaniline or polypyrrole, fullerene, or the like, or any other kind of insulative materials, such as ceramics or the like. As discussed above, non-transparent electro-rheological fluid may also be used in some applications.

Spacers 150 may be disposed in the gap between the lower substrate 110 and the upper substrate 120. The spacers 150 may be elastic elements made of small, transparent particles having a size of less than several tens of micrometers, and may be distributed in the electrorheological fluid 130 either randomly or at regular intervals. The spacers 150 illustrated in FIG. 2 may be exaggerated in size for clarity. The spacers 150 may provide the upper substrate 120 with a restoring force in case that the upper substrate 120 is deformed, and may support the upper substrate 120 structurally. There is no specific restriction on the type of material used to fabricate the spacers 150. For example, the spacers 150 may be formed of an elastomer, or other similar material.

The electrode pairs 140 may include a plurality of pairs of electrodes, each including lower and upper electrodes formed on the lower and upper substrates 110 and 120, respectively. The electrode pairs 140 may be arranged on the entire surface of the touch panel body 10 or only on a particular part of the touch panel body 10 in the form of a matrix. The driving voltage $V_d$ may be applied to a combination of the electrode pairs 140, for example, to some of the electrode pairs 140. The touch panel 1 may offer clicking sensations or various other input sensations by controlling or varying the number and position of electrode pairs 140 to which the driving voltage $V_d$ is applied, the timing of releasing the driving voltage $V_d$, or the number and position of electrode pairs 140 from the driving voltage $V_d$ is released.

The electrode pairs 140 illustrated in FIG. 2 may be an example of pairs of electrodes that are arranged in the form of a matrix. Referring to FIG. 2, a plurality of pairs of electrode lines, i.e., a plurality of lower electrode lines 142 and a plurality of upper electrode lines 144, may be formed on the top surface of the lower substrate 110 and the bottom surface of the upper substrate 120, respectively. The lower electrode lines 142 may extend in parallel in a first direction, and the upper electrode lines 144 may extend in parallel in a second direction that is perpendicular to the first direction. The electrode pairs 140, i.e., a plurality of capacitance nodes, may be defined at the intersections between the lower electrode lines 142 and the upper electrode lines 144, and may be arranged over the entire surface of the touch panel body 10 in the form of a matrix. Unlike the example illustrated in FIG. 2, it is also possible that the lower and upper electrodes constructing the electrode pairs 140 may be disposed in a dot pattern on the lower substrate 110 and the upper substrate 120 in such a manner as to face each other. That is, FIG. 2 shows line-type electrode patterns. However, it is also possible to provide an N×N array of electrodes on both the top and bottom, such that each individual pair of electrodes (top and bottom) is separately addressable and controllable.

Referring to FIGS. 1 and 2, a driving signal applied to the electrode pairs 140, i.e., the driving voltage $V_d$, may provide a driving force for varying the viscosity of the electrorheological fluid 130 locally. The driving voltage $V_d$ may be supplied by a driving voltage source (not shown) of the power source 40. The number and position of electrode pairs 140 to which the driving voltage $V_d$ is applied, the timing of releasing the driving voltage $V_d$, the number and position of electrode pairs 140 from which the driving voltage $V_d$ is released, and the like may be controlled by the controller 50. The controller 50 may determine whether to apply the driving voltage $V_d$ to the electrode pairs 140 by applying a driving selection signal $S_d$ to the driving device 20.

Referring to FIG. 3, the driving voltage $V_d$ may be applied to electrode pairs 140 in region I and may not be applied to electrode pairs 140 in regions II. For example, in response to the driving voltage $V_d$ being applied to the upper electrode lines 144, lower electrode lines 142 in region I may be grounded, and lower electrode lines 142 in regions II may be floated. As another example, in response to the driving voltage $V_d$ being applied to the lower electrode lines 142, the upper electrode lines 144 may be grounded or floated. Electrodes to which the driving voltage $V_d$ is applied are referred to as "driving electrodes," and electrodes that face the driving electrodes and are either grounded or floated in response to the driving voltage $V_d$ being applied to the driving electrodes are referred to as "sensing electrodes."

In response to the driving voltage $V_d$ being applied to the electrode pairs 140 in region I, an electric field may be induced locally between the lower substrate 110 and the upper substrate 120. Due to the electric field, the viscosity of the electrorheological fluid 130 in region I may increase because the particles 134 that have polarization characteristics are aligned in the direction of the electric field, as shown in FIG. 3. In regions II, no electric field may be generated between the lower substrate 110 and the upper substrate 120 unless the driving voltage $V_d$ is applied to the electrode pairs 140 in regions II. Accordingly, there is no variation in the viscosity of the electro-rheological fluid 130 in regions II.

The electrorheological fluid 130 in region I may return to its original viscosity level in response to the driving voltage $V_d$ being released from region I.

An example of a touch panel using changes in the viscosity of an electrorheological fluid is disclosed in detail in U.S. application Ser. No. 12/780,996, entitled "Touch Panel and Electronic Device Including the Same," filed on May 17, 2010, by the applicant of the current invention. U.S. application Ser. No. 12/780,996 discloses a touch panel which defines a predetermined input button area on a user touch surface using changes in the viscosity of an electrorheological fluid therebelow and offers a clicking sensation like pressing a mechanical keypad. The entire disclosure of U.S. patent application Ser. No. 12/780,996 is incorporated by reference herein for all purposes.

The term "clicking sensation," as used herein, refers to the sensation that can be felt by a finger upon pressing a mechanical keypad or a key button of a mobile phone or the like. In a mechanical keypad, a metal thin plate having a dome shape, which is referred to as a metal dome or popple, is installed below a key button. When the metal dome is pressed with a force exceeding a predetermined threshold, the metal dome is deformed at a certain time, which is referred to as a buckling point. Due to the buckling point, the user feels a clicking sensation upon pressing the mechanical keypad.

Figure 4:
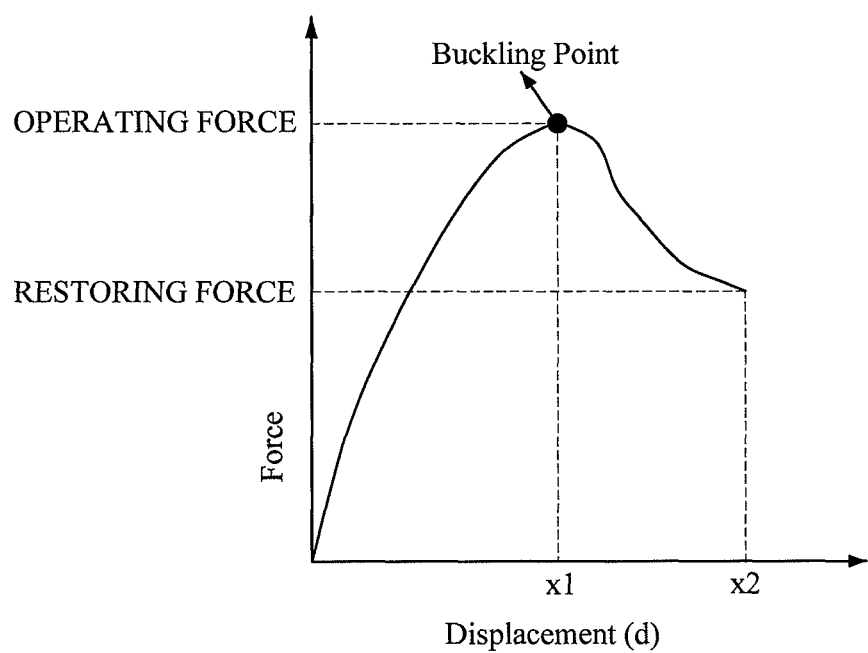
FIG. 4 is a diagram illustrating an example of the relationship between force and displacement in a mechanical keypad having a metal dome.

FIG. 4 is a graph showing an example of the relationship between force and displacement in a mechanical keypad with a metal dome. Referring to FIG. 4, initially, the displacement of the metal dome increases gradually as a pressing force increases. Along with the increase of the metal dome's displacement, the supporting force (a resistive force against deformation) of the metal dome increases, and accordingly, a repulsive force also increases. When the displacement of the metal dome reaches x1, the supporting force (a resistive force against deformation) of the metal dome reaches a maximum (an operating force) and then sharply decreases. This point corresponds to a buckling point at which the supporting force of the metal dome is at a maximum (i.e., at which an operating force is applied onto the touch panel). If the pressing force is maintained after the bucking point, the displacement of the metal dome continues to increase, and when the displacement of the metal dome reaches x2, the metal dome contacts the lower electrodes. Thereafter, when the pressing force disappears, the metal dome returns to its original state by a return force.

Figure 5:
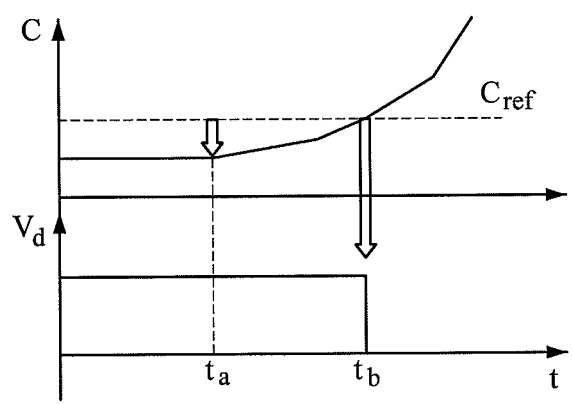
FIG. 5 is a diagram illustrating an example of the timings of applying a driving voltage to and releasing the driving voltage from electrode pairs of the touch panel body illustrated in FIG. 2.

The touch panel 1 illustrated in FIG. 1 provides a clicking sensation by imitating the mechanism of such a mechanical keypad. FIG. 5 illustrates an example of the timings of applying the driving voltage $V_d$ to and releasing the driving voltage $V_d$ from the electrode pairs 140 of the touch panel 1.

As described above, in response to the driving voltage $V_d$ being applied to the electrode pairs 140, the electrorheological fluid 130 may be driven locally, and accordingly, the viscosity of the electrorheological fluid 130 may increase. A portion of the electrorheological fluid 130 where an increase in viscosity is detected is referred to as a "driving region," and the rest of the electrorheological fluid 130 where no viscosity increase is detected is referred to as a "non-driving region." The driving region may provide a greater repulsive force than the non-driving region against a pressing force. Accordingly, by pressing the driving region, it is possible to feel almost the same repulsive force as that obtained when pressing a mechanical keypad.

Referring to FIG. 5, in response to a driving region being pressed at $t_a$, the upper substrate 120 may be recessed so that the distance between each of the electrode pairs 140 can decrease. As a result, capacitance C of a capacitance node corresponding to the driving region may increase. In response to the user continuing to press the same driving region, the displacement of the upper substrate 120 may increase. Accordingly, the repulsive force of the touch panel 1 may increase, and the capacitance C may further increase. In a case in which the displacement of the upper substrate 120 increases to a degree that the capacitance C reaches a reference level $C_{ref}$, it may be determined that an input of the user has been entered to the capacitance node corresponding to the driving region (at $t_b$), and at the same time, the driving voltage $V_d$ may be released from the electrode pairs 140. In response to the driving voltage $V_d$ being released from the electrode pairs 140, the viscosity of the electrorheological fluid 130 may considerably decrease, and accordingly, the repulsive force against the force of pressing the driving region may considerably decrease. In this manner, it is possible to provide a similar clicking sensation to that obtained at the buckling point at the time (i.e., the time $t_b$) when the driving voltage $V_d$ is released.

Referring again to FIGS. 1 through 3, the driving device 20 may apply a combination of the driving voltage $V_d$ for generating a potential difference in the capacitance nodes and a sensing voltage $V_s$ for sensing any variations in the capacitances of the capacitance nodes to the electrode pairs 140. The driving voltage $V_d$ may be supplied by the driving voltage source of the power source 40, and the sensing voltage $V_s$ may be supplied by a sensing voltage source (not shown) of the power source 40. The combination of the driving voltage $V_d$ and the sensing voltage $V_s$ may be determined by a combination of the driving selection signal $S_d$ and a sensing selection signal $S_s$, which is further described with reference to FIGS. 12A through 12D.

The driving voltage $V_d$ may be applied to all or some of the electrode pairs 140. The driving voltage $V_d$ may be applied only for a short period of time or for a long period of time (e.g., for as long as the touch panel 1 operates). The driving voltage $V_d$ may be a driving pulse voltage applied to the driving electrodes for an amount of time (e.g., a time period between 0 and $t_9$ shown in FIG. 7). The time $t_9$ may be fixed or variable, or may be set to an arbitrary value by the user or by the controller.

The expression "applying the driving voltage $V_d$ to an electrode pair 140 or a single driving voltage," as used herein, may be interpreted as generating a potential difference in a pair of electrodes formed on the lower substrate 110 and the upper substrate 120 to generate an electric field locally between the lower substrate 110 and the upper substrate 120. In response to an electric field being induced locally between the lower substrate 110 and the upper substrate 120, the viscosity of the electrorheological fluid 130 may increase locally. Accordingly, in response to the driving voltage $V_d$ being applied only to some of the electrode pairs 140, a region in which an electric field is generated and the viscosity of the electrorheological fluid 130 increases may become a driving region. In a non-driving region, the viscosity of the electrorheological fluid 130 does not change.

As described above, in the case of using line-type electrodes, each of the electrode pairs 140 may be defined by points at which a pair of electrode lines 142 and 144 intersect each other, as illustrated in FIG. 2. In this example, the driving device 20 may apply the driving voltage $V_d$ to some of the upper electrode lines 144 connected to one or more driving cells in a driving region, e.g., the fourth, fifth, and sixth row electrode lines R4, R5, and R6 illustrated in FIG. 6, may ground the lower electrode lines 142 connected to the driving cells in the driving region (e.g., the column electrode lines C4, C5, and C6 illustrated in FIG. 6), and may float the other lower electrode lines 142. The electric potentials that the driving device 20 applies to the upper electrode lines 144 and the lower electrode lines 142 may vary.

The sensing voltage $V_s$ may be sequentially applied to the electrode pairs 140, and more particularly, to the driving electrodes. For example, the sensing voltage $V_s$ may be sequentially applied to the driving electrodes. As another example, the driving electrodes may be divided into one or more groups, for example, a lower electrode line 142 or an upper electrode line 144, and the sensing voltage $V_s$ may be sequentially applied to the groups. In response to the sensing voltage $V_s$ being sequentially applied to the driving electrodes, the sensing device 30 may detect an input or the position of the input by sensing any capacitance variations from the sensing electrodes.

The sensing voltage $V_s$ may include a plurality of voltage pulses, and may be applied for a shorter period of time (e.g., for as long as the period between 0 and $t_1$ of FIG. 7) than the driving voltage $V_d$. For example, the sensing voltage $V_s$ may be applied one or more times during the application of the driving voltage $V_d$ (e.g., during the period between 0 and $t_9$ of FIG. 7). In this example, the sensing device 30 may detect an input by sensing the output of the sensing electrodes resulting from capacitance variations in the capacitance nodes in response to the sensing voltage $V_s$ being applied through the driving electrodes.

The sensing voltage $V_s$ may be sequentially applied to all the driving electrodes or to some of the driving electrodes to which the driving voltage $V_d$ is applied. In the former case, the sensing of an input may be performed not only on the driving electrodes to which the driving voltage $V_d$ is applied but also on driving electrodes to which no driving voltage is applied. In response to the sensing voltage $V_s$ being applied even to the driving electrodes to which no driving voltage is applied, the sensing of an input may be performed not only in a driving region but also in a non-driving region on the touch panel 1.

For example, the sensing voltage $V_s$ may be sequentially scanned and applied to the driving electrodes (e.g., row electrode lines or column electrode lines) to sense a multi-touch input. In this example, since the sensing voltage $V_s$ is scanned only to the driving electrodes, it is possible to provide a faster sensing speed than when using an existing X-Y full matrix scan method.

The sensing device 30 may detect an input from the touch panel body 10. For example, in response to an input being detected from the touch panel body 10, the sensing device 30 may calculate the location of the detected input, and may transmit the result of the calculation to the controller 50. As another example, the sensing device 30 may transmit an input signal to the controller 50, and may allow the controller 50 to calculate the location of the detected input. As described above with reference to FIG. 5, the sensing device 30 may detect an input of the user and/or the location of the detected input based on a capacitance variation AC that results from a variation in the distance in the electrode pairs 140.

An input signal including the results of sensing performed by the sensing device 30, i.e., information indicating the existence of an input and the location of the input, may be transmitted to the controller 50. In response to the input signal being received from the sensing device 30, the controller 50 may transmit the driving selection signal $S_d$ to the driving device 20 to release the driving voltage $V_d$ from all or some of the driving electrodes in a driving region. In response to the driving voltage $V_d$ being released, a clicking sensation may be provided through the touch panel 1.

As described above, the driving device 20 may apply a combined signal $V_c$, which is a combination of the driving voltage $V_d$ and the sensing voltage $V_s$, to the electrode pairs 140 according to the combination of the driving selection signal $S_d$ and the sensing selection signal $S_s$. The combined signal $V_c$ may be one of a zero voltage (in a case in which neither the driving voltage $V_d$ nor the sensing voltage $V_s$ is applied), the driving voltage $V_d$, the sensing voltage $V_s$, and a signal obtained by combining the driving voltage $V_d$ and the sensing voltage $V_s$.

The driving voltage $V_d$ may have an electric potential of dozens of volts, e.g., at least about 50V (preferably about 200 V) and may vary according to the physical and chemical properties of the material of the electrorheological fluid 130 or the distance between the lower substrate 110 and the upper substrate 120. On the other hand, the sensing voltage $V_s$ may have an electric potential of several volts, e.g., about 5V, and may vary according to the electrical properties of the sensing device 30. The sensing device 30 may be configured to perform sensing at a lower voltage than the driving voltage $V_d$. The signal obtained by combining the driving voltage $V_d$ and the sensing voltage $V_s$ may be a subtracted voltage $(V_d - V_s)$ obtained by subtracting the driving voltage $V_d$ from the sensing voltage $V_s$ or a sum voltage $(V_d + V_s)$ obtained by adding the driving voltage $V_d$ and the sensing voltage $V_s$. The subtracted voltage $(V_d - V_s)$ or the added voltage $(V_d + V_s)$ may serve as a sensing signal without adversely affecting the driving of the electrorheological fluid 130.

The controller 50 may control the type of signal applied by the driving device 20 to the driving electrodes. For example, the controller 50 may control the driving device 20 to apply at least one of a zero voltage (in a case in which neither the driving voltage $V_d$ nor the sensing voltage $V_s$ is applied), the driving voltage $V_d$, the sensing voltage $V_s$, and a signal obtained by combining the driving voltage $V_d$ and the sensing voltage $V_s$ to the driving electrodes. In this example, the controller 50 may transmit the driving selection signal $S_d$ for giving an instruction to apply the driving voltage $V_d$ and the sensing selection signal $S_d$ for giving an instruction to apply the sensing voltage $V_s$ to the driving device 20.

The driving selection signal $S_d$ may be a signal for giving an instruction to apply the driving voltage $V_d$ or an instruction not to apply the driving voltage $V_d$. In response to the driving selection signal $S_d$ being applied to the driving device 20, the driving device 20 may decide whether to apply the driving voltage $V_d$ to the driving electrodes according to the properties of the driving selection signal $S_d$ and the circuitry configuration of the driving device 20. The sensing selection signal $S_s$ may be a signal for giving an instruction to apply the sensing voltage $V_s$ or an instruction not to apply the sensing voltage $V_s$. In response to the sensing selection signal $S_s$ being applied to the driving device 20, the driving device 20 may decide whether to apply the sensing voltage $V_s$ to the driving electrodes according to the properties of the sensing selection signal $S_s$ and the circuitry configuration of the driving device 20.

Figure 7:
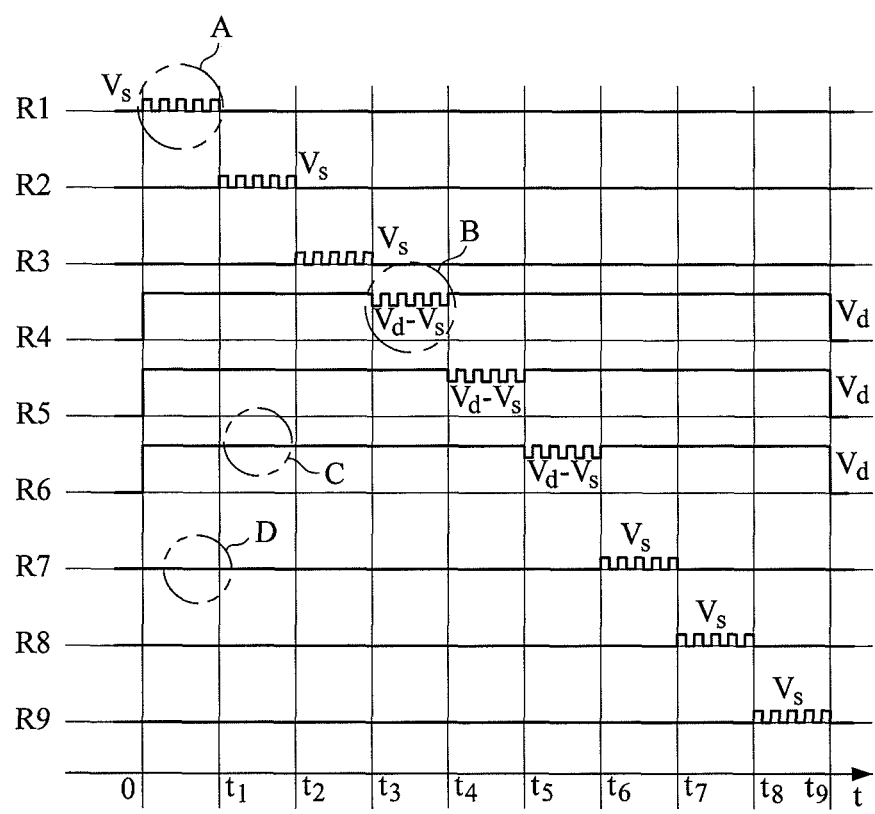
FIG. 7 is a timing chart showing examples of various combinations of a driving voltage and a sensing voltage that can be applied by a driving device for a touch panel according to an embodiment.

The controller 50 may control the driving voltage $V_d$ to be applied to the driving electrodes for a relatively long period of time (e.g., for as long as the period between 0 and $t_9$ of FIG. 7 or for at least 1 second). The duration of the application of the driving voltage $V_d$ may be determined based on a default value set in the touch panel 1 or may be arbitrarily determined by the user. Alternatively, the duration may be set according to experimental data. The controller 50 may control the sensing voltage $V_s$ to be applied to the driving electrodes only for a short period of time (e.g., for as long as the period between 0 and $t_1$ of FIG. 7 or for several centiseconds or milliseconds. The shorter the duration of the application of the sensing voltage $V_s$, the shorter the period that it takes to sense over the entire surface of the touch panel 1.

For example, the controller 50 may control the driving device 20 to apply the driving voltage $V_d$ only to three row electrode lines (i.e., the fourth through sixth row electrode lines R4 through R6) that are connected to nine driving cells, instead of applying the driving voltage $V_d$ to all the first through ninth row electrode lines R1 through R9. In this example, the driving voltage $V_d$ may be applied to the fourth through sixth row electrode lines R4 through R6 at the same time. For example, the controller 50 may control the driving device 20 to apply the sensing voltage $V_s$ to all the first through ninth row electrode lines R1 through R9. In this example, the sensing voltage $V_s$ may be sequentially applied to the first through ninth row electrode lines R1 through R9. In response to the sensing voltage $V_s$ being sequentially applied to the first through ninth row electrode lines R1 through R9, the sensing device 30 may perform the detection of an input and the sensing of the location of the input at the same time.

Figure 6:
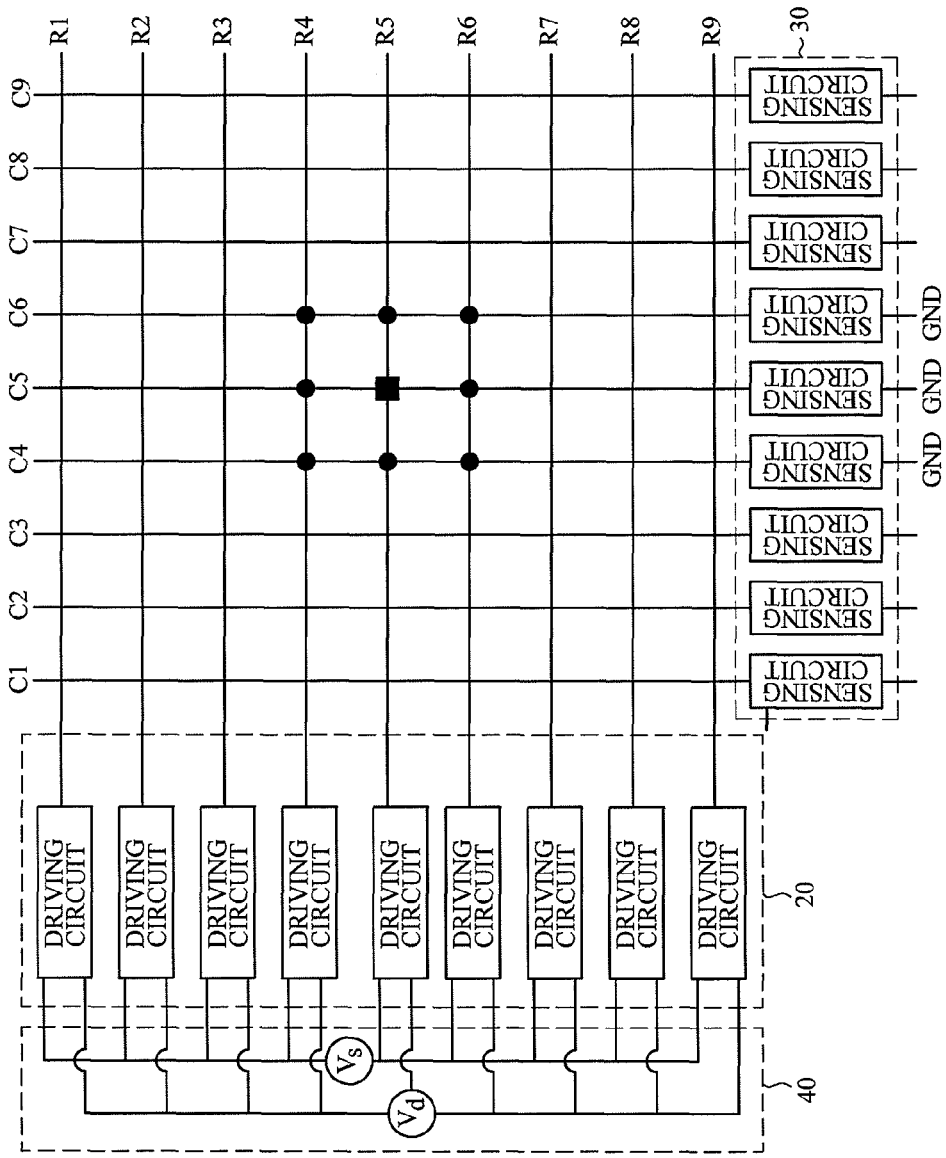
FIG. 6 is a diagram illustrating an example of a circuit structure for driving and sensing a touch panel according to an embodiment.

FIG. 6 illustrates an example of a circuit structure for driving and sensing a touch panel. The circuit structure illustrated in FIG. 6 only includes some of the electrode pairs 140 of the touch panel body 10 illustrated in FIG. 2, for example, nine lower electrode lines 142 and nine upper electrode lines 144. For example, the nine lower electrode lines 142 may correspond to first through ninth row electrode lines R1 through R9 illustrated in FIG. 6, and the upper electrode lines 144 may correspond to first through ninth column electrode lines C1 through C9, illustrated in FIG. 6. As another example, the nine lower electrode lines 142 may correspond to the first through ninth column electrode lines C1 through C9, and the upper electrode lines 144 may correspond to the first through ninth row electrode lines R1 through R9. Referring to FIG. 6, capacitance nodes at the intersections between the fourth through sixth row electrode lines R4 through R6 and the fourth through sixth column electrode lines C4 through C6 may be driving cells.

Referring to FIGS. 1 and 6, the touch panel 1 may include the power source 40, the driving device 20, and the sensing device 30, and may also include the controller 50 for controlling the operations of the driving device 20 and the sensing device 30.

The power source 40 may generate the driving voltage $V_d$ and the sensing voltage $V_s$, and may apply the driving voltage $V_d$ and the sensing voltage $V_s$ to the driving device 20. The power source may include the driving voltage source that generates the driving voltage $V_d$ and the sensing voltage source that generates the sensing voltage $V_s$. The driving voltage $V_d$ may be an example of a driving signal for driving the electrorheological fluid 130, and the sensing voltage $V_s$ may be an example of a sensing signal for determining whether an input of the user has been entered. The driving voltage $V_d$ may have a high potential of about dozens of volts (e.g., about 40 V) to drive the electrorheological fluid 130, whereas the sensing voltage $V_s$ may have a low potential of several volts (e.g., about 3.3 V) to sense an input.

The driving voltage $V_d$ and the sensing voltage $V_s$ may be supplied by the power source 40 to the driving device 20. For example, the driving device 20 may be connected continuously to the power source 40. In this example, the driving device 20 may selectively apply the driving voltage $V_d$ and the sensing voltage $V_s$ to the electrode pairs 140 according to a combination of control signals (e.g., the driving selection signal $S_d$ and the sensing selection signal $S_s$) input thereto by the controller 50. As another example, the driving voltage $V_d$ and the sensing voltage $V_s$ may be configured to be supplied to the driving device 20 only for a certain time.

The driving device 20 may apply a combination of the driving voltage $V_d$ and the sensing voltage $V_s$ that are both supplied by the power source 40 to the first through ninth row electrode lines R1 through R9. The driving device 20 may include a plurality of driving circuits to combine the driving voltage $V_d$ and the sensing voltage $V_s$ for the first through ninth row electrode lines R1 through R9. For example, the driving device 20 may include as many driving circuits as there are row electrode lines. In this example, the driving circuits may respectively correspond to the first through ninth row electrode lines R1 through R9. As another example, the driving device 20 may include only one driving circuit and a switching device such as a multiplexer (MUX). In this example, the driving device 20 may sequentially apply combinations of the driving voltage $V_d$ and the sensing voltage $V_s$ to the first through ninth row electrode lines R1 through R9 by using the switching device. The structure of the driving device 20 is further described with reference to FIGS. 10 and 11.

FIG. 7 illustrates examples of various combinations of the driving voltage $V_d$ and the sensing voltage $V_s$ that may be applied to each of the row electrode lines R1 through R9 illustrated in FIG. 6. Referring to FIG. 7, the driving voltage $V_d$ is applied only to three of the first through ninth row electrode lines R1 through R9, e.g., the fourth through sixth row electrode lines R4 through R6 that are connected to the driving cells illustrated in FIG. 6. Alternatively, the driving voltage may be applied to a different number of the electrode lines. The sensing voltage $V_s$ is sequentially applied to the first through ninth row electrode lines R1 through R9. The durations of the application and the magnitudes of the driving voltage $V_d$ and the sensing voltage $V_s$ illustrated in FIG. 7 are merely exemplary. The sensing voltage $V_s$ is illustrated in FIG. 7 as being applied to each of the first through ninth row electrode lines R1 through R9 only once. However, the sensing voltage $V_s$ may be applied to each of the first through ninth row electrode lines R1 through R9 two or more times.

Referring to FIG. 7, the driving device 20 may apply the combined signal $V_c$, which is obtained by combining the driving voltage $V_d$ and the sensing voltage $V_s$, to each of the first through ninth row electrode lines R1 through R9. The combined signal $V_s$ may be a zero voltage including none of the driving voltage $V_d$ and the sensing voltage $V_s$, as indicated by a dotted circuit D of FIG. 7, a driving voltage signal including the driving voltage $V_d$, but not including the sensing voltage $V_s$, as indicated by a dotted circle C of FIG. 7, or a subtracted voltage $(V_d-V_s)$ obtained by subtracting the sensing voltage $V_s$ from the driving voltage $V_d$, as indicated by a dotted circle B of FIG. 7. The driving circuit(s) of the driving device 20 may be configured to be able to output all one voltage level (e.g., a zero voltage or a high voltage), the driving voltage signal, and the subtracted voltage $(V_d-V_s)$.

Figure 8:
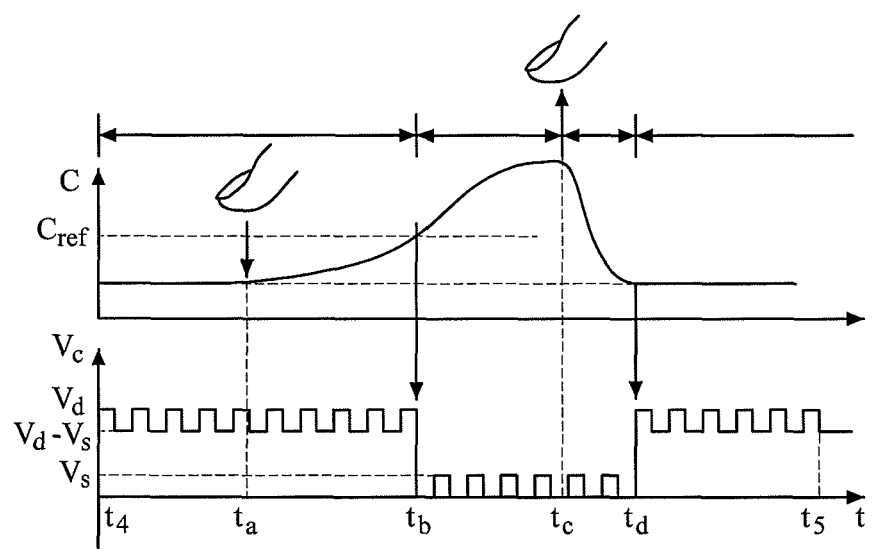
FIG. 8 is a diagram illustrating examples of a combined signal and an example of the variation of capacitance with respect to the combined signal according to an embodiment.
Figure 9A:
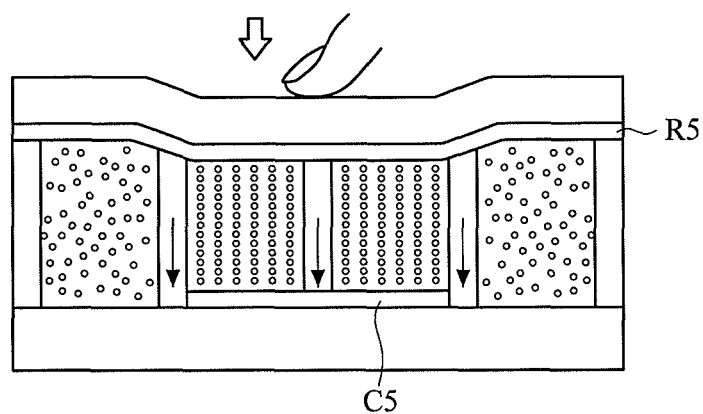
FIGS. 9A through 9C are cross-sectional views illustrating an example of the variation of the shape of a portion of a touch panel body corresponding to a capacitance node over the course of the application of a combined signal according to an embodiment.
Figure 9B:
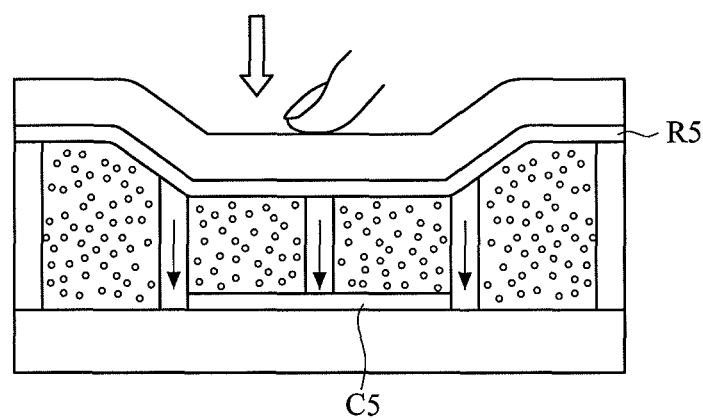
Figure 9C:
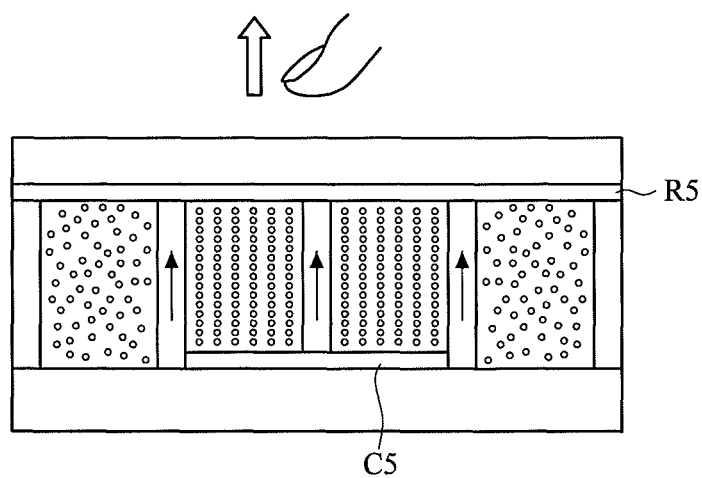

FIG. 8 illustrates examples of the combined signal $V_s$ and an example of the variation of the capacitance C with respect to the combined signal V. The timing chart illustrated in FIG. 8 shows an example of providing a clicking sensation is illustrated in FIG. 8, and may be a timing chart of the combined signal $V_c$ that is applied to the driving electrode of the capacitance node at the intersection between the fifth row electrode line R5 and the fifth column electrode line C5 in a time period between $t_4$ and $t_5$ of FIG. 7. FIGS. 9A through 9C illustrate an example of the variation of the shape of a portion of the touch panel body 10 corresponding to the capacitance node at the intersection between the fifth row electrode line R5 and the fifth column electrode line C5 over the course of the application of the combined signal V.

Referring to FIG. 8, only the driving voltage $V_d$ is applied in the time period before $t_4$, and the sensing voltage $V_s$ is applied at $t_4$. For example, the subtracted voltage $(V_d-V_s)$ starts to be applied at $t_4$. In response to the user pressing the portion of the touch panel body 10 corresponding to the capacitance node at the intersection between the fifth row electrode line R5 and the fifth column electrode line C5 at $t_a$, as shown in FIG. 9A, the distance between the lower substrate 110 and the upper substrate 120 may decrease. Accordingly, since the distance between a pair of electrodes 140 corresponding to the capacitance node at the intersection between the fifth row electrode line R5 and the fifth column electrode line C5 decreases, the capacitance C of the capacitance node at the intersection between the fifth row electrode line R5 and the fifth column electrode line C5 increases.

In response to the user further pressing the portion of the touch panel body 10 corresponding to the capacitance node at the intersection between the fifth row electrode line R5 and the fifth column electrode line C5, the distance between the lower substrate 110 and the upper substrate 120 may decrease, and the capacitance C of the capacitance node at the intersection between the fifth row electrode line R5 and the fifth column electrode line C5 may further increase. In response to the capacitance C of the capacitance node at the intersection between the fifth row electrode line R5 and the fifth column electrode line C5 continuing to increase and reaching the reference level $C_{ref}$ at $t_b$, the sensing device 30 may determine that an input of the user has been entered, and may transmit an input signal to the controller 50.

The controller 50 may receive the input signal, and may use the driving selection signal $S_d$ to control the driving device 20 to stop applying the driving voltage $V_d$. As a result, in a time period after $t_b$, the driving voltage $V_d$ is not applied any longer, and only the sensing voltage $V_s$ is applied. Since the driving voltage $V_d$ is not applied any longer, the viscosity of the electrorheological fluid 130 at the intersection between the fifth row electrode line R5 and the fifth column electrode line C5 may considerably decrease, as shown in FIG. 9B, thereby providing the user with a clicking sensation.

In response to the user continuing to press the portion of the touch panel body 10 corresponding to the capacitance node at the intersection between the fifth row electrode line R5 and the fifth column electrode line C5 even after $t_b$, the distance between the lower substrate 110 and the upper substrate 120 may still further decrease, and the capacitance of the capacitance node at the intersection between the fifth row electrode line R5 and the fifth column electrode line C5 may still further increase. In response to the user stopping entering an input at tc, the distance between the lower substrate 110 and the upper substrate 120 may begin to increase due to a restoring force, and the capacitance C of the capacitance node at the intersection between the fifth row electrode line R5 and the fifth column electrode line C5 may begin to decrease. In response to the capacitance C of the capacitance node at the intersection between the fifth row electrode line R5 and the fifth column electrode line C5 decreasing, the controller 50 may use the driving selection signal $S_d$ to control the driving device 20 to resume applying the driving voltage $V_d$. As a result, referring to FIG. 8, the driving device 20 may resume applying the driving voltage $V_d$ at $t_d$, but the time when the driving device 20 resumes applying the driving voltage $V_d$ is merely exemplary. In a case in which the time when the driving device 20 resumes applying the driving voltage $V_d$ falls within the duration of the application of the sensing voltage $V_s$, the subtracted voltage $(V_d-V_s)$ is applied. Referring to FIG. 9C, in response to the driving device 20 resuming applying the driving voltage $V_d$, the viscosity of the electrorheological fluid 130 at the intersection between the fifth row electrode line R5 and the fifth column electrode line C5 may begin to increase.

Figure 10:
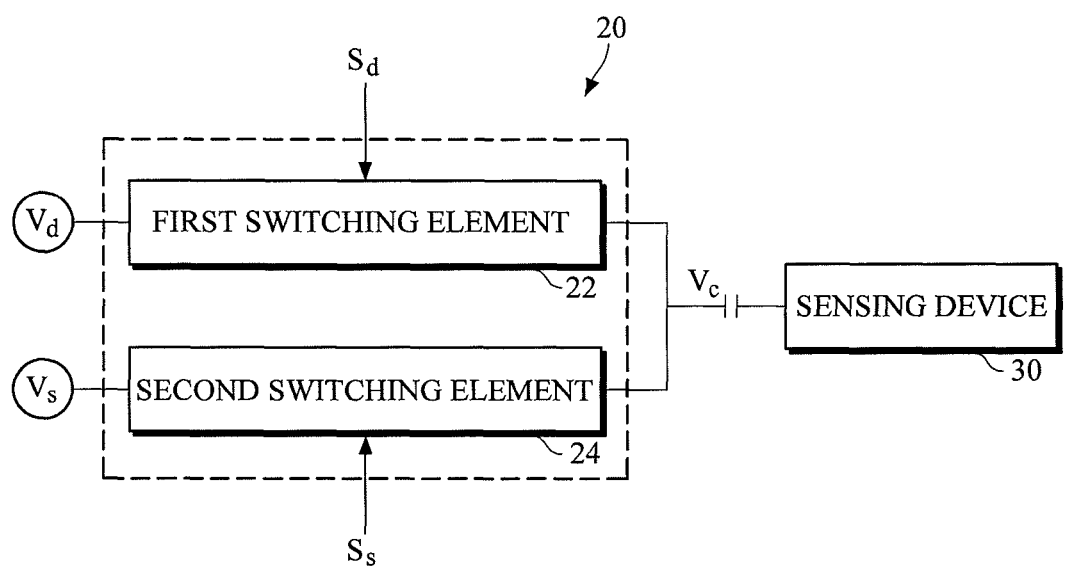
FIG. 10 is a block diagram illustrating an example of the touch panel illustrated in FIG. 1 according to an embodiment.

FIG. 10 illustrates an example of the driving device 20. Referring to FIG. 10, the driving device 20 may apply the combined signal $V_c$ that is obtained by combining the driving voltage $V_d$ and the sensing voltage $V_s$ to the driving electrode of at least one capacitance node. The driving device 20 may include a first switching element 22 to apply the driving voltage $V_d$ and a second switching element 22 to apply the sensing voltage $V_s$. The input and output ports of the first switching element 22 may be connected to the driving voltage source and the driving electrodes, respectively, and the input and output ports of the second switching element 24 may be connected to the sensing voltage source and the driving electrodes, respectively.

The first switching element 22 may selectively apply the driving voltage $V_d$ to the driving electrodes in response to the driving selection signal $S_d$ being applied thereto. The second switching element 24 may selectively apply the sensing voltage $V_s$ to the driving electrodes in response to the sensing selection signal $S_s$ being applied thereto. For example, the output ports of the first and second switching elements 22 and 24 may be connected in parallel to the electrode pairs 140. In this example, in response to the first and second switching elements 22 and 24 both being turned on, the subtracted voltage $(V_d-V_s)$ may be applied to the electrode pairs 140. The sensing device 30 may be connected to the sensing electrodes, and may detect an input from the capacitance nodes in response to the sensing voltage $V_s$ being applied thereto.

Figure 11:
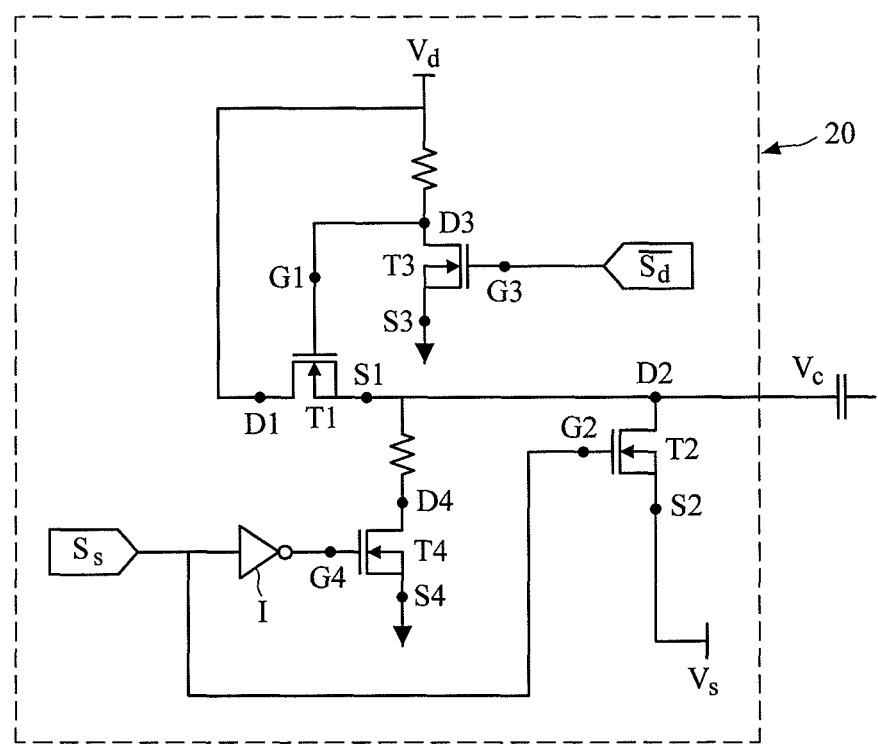
FIG. 11 is a circuit diagram illustrating an example of a driving device illustrated in FIG. 10 according to an embodiment.

FIG. 11 illustrates an example of the driving device 20. Referring to FIG. 11, the driving device 20 may include four transistors. For example, the driving device 20 may apply a high voltage of about 200 V to increase the viscosity of the electrorheological fluid 130. In this case, the four transistors may be high-voltage transistors. The four transistors are illustrated in FIG. 11 as all being N-type metal oxide semiconductor (NMOS) transistors, but they are not restricted to this. For example, the transistors may be P-type metal oxide semiconductor (PMOS) transistors, or a combination of NMOS and PMOS transistors depending on the design of the circuit. Alternatively, one of ordinary skill in the art will appreciate that other transistors may also be used.

Assume that the driving selection signal $S_d$ and the sensing selection signal $S_s$ are instructions to apply the driving voltage $V_d$ and $V_s$, respectively.

Referring to FIG. 11, the driving device 20 may include a first transistor T1 that is switched on or off to apply the driving voltage $V_d$ and a second transistor T2 that is switched on or off to apply the sensing voltage $V_s$. A source S1 and a drain D1 of the first transistor T1 may be coupled to the driving voltage source and the driving electrodes, respectively. A source S2 and a drain D2 of the second transistor T2 may be coupled to the sensing voltage source and the driving electrodes, respectively.

The driving device 20 may determine whether to apply the driving voltage $V_d$ according to the driving selection signal $S_d$ applied thereto by the controller 50. The driving device 20 may also include a third transistor that is a switching element to switch on or off the first transistor T1 according to a driving selection signal $\overline{S_d}$ having an opposite logic value to that of the driving selection signal $S_d$. A gate G3 of the third transistor T3 may be connected to a port that applies the driving selection signal $\overline{S_d}$. For example, at least one of a source S3 and a drain D3 (e.g., the drain D3 in the example shown in FIG. 11) of the third transistor T3 may be electrically coupled to the gate G1 of the first transistor T1. In this example, the first transistor T1 may be turned on or off according to the electric potential of the node between the drain D3 of the third transistor T3 and the gate G1 of the first transistor T1.

As another example, the port that applies the driving selection signal $\overline{S_d}$ may be directly coupled to the gate G1 of the first transistor T1.

The driving device 20 may also include a fourth transistor T4 to maintain the bias of the driving electrodes. Since, in a case in which the second transistor T2 is turned on, the bias of the driving electrodes may be maintained due to the electrical connection between the driving electrodes and the second transistor T2, the fourth transistor T4 may be configured to operate in response to the second transistor T2 being turned off. The driving device 20 may also include an inverter I that is disposed between the fourth transistor T4 and the port that applies the driving selection signal $\overline{S_d}$.

Figure 12A:
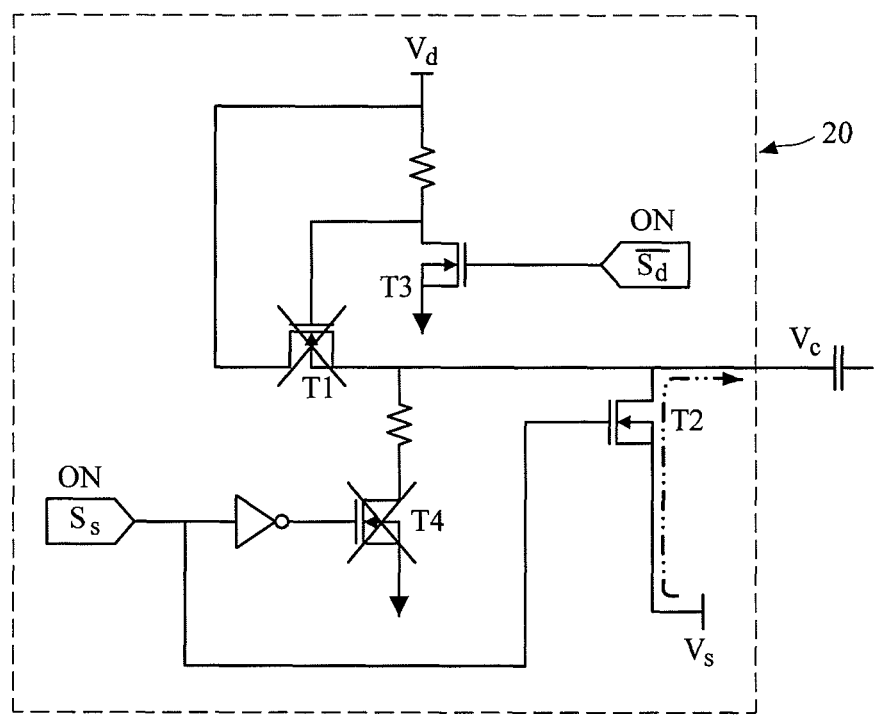
FIGS. 12A through 12D are circuit diagrams illustrating examples of the operation of the driving device illustrated in FIG. 11 according to an embodiment.
Figure 12B:
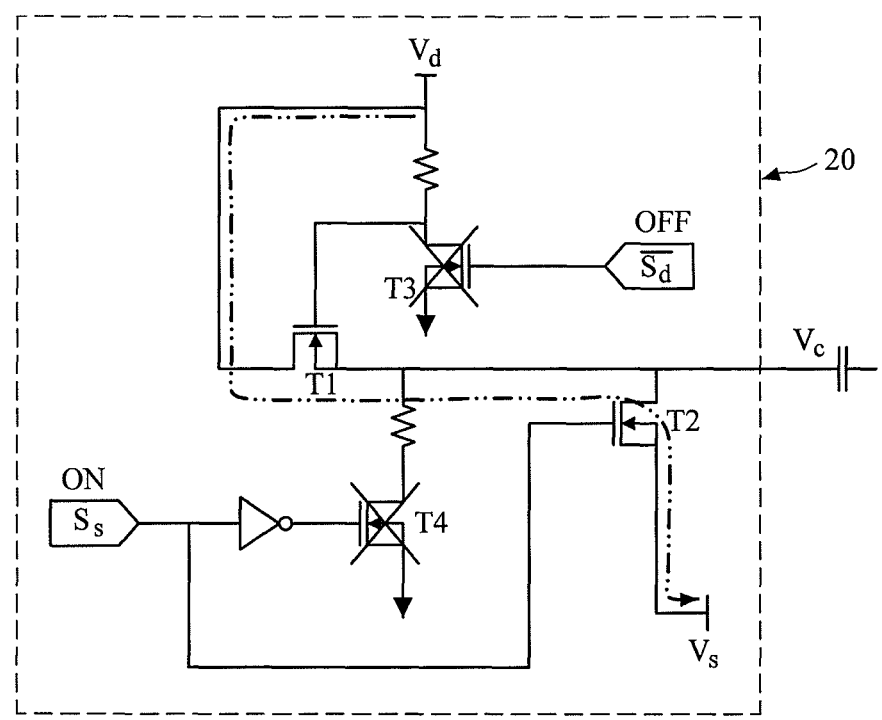
Figure 12C:
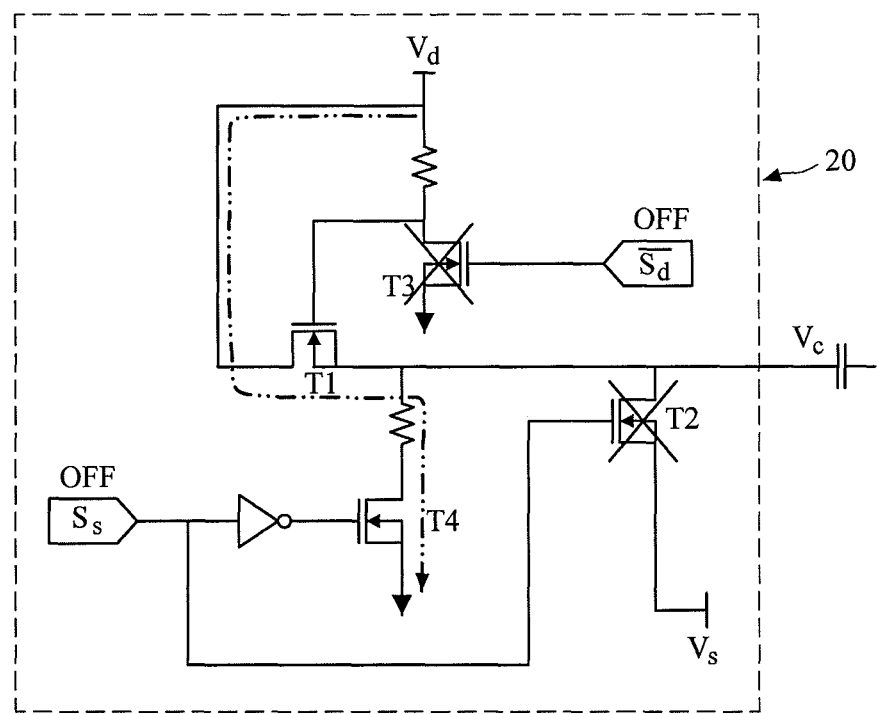
Figure 12D:
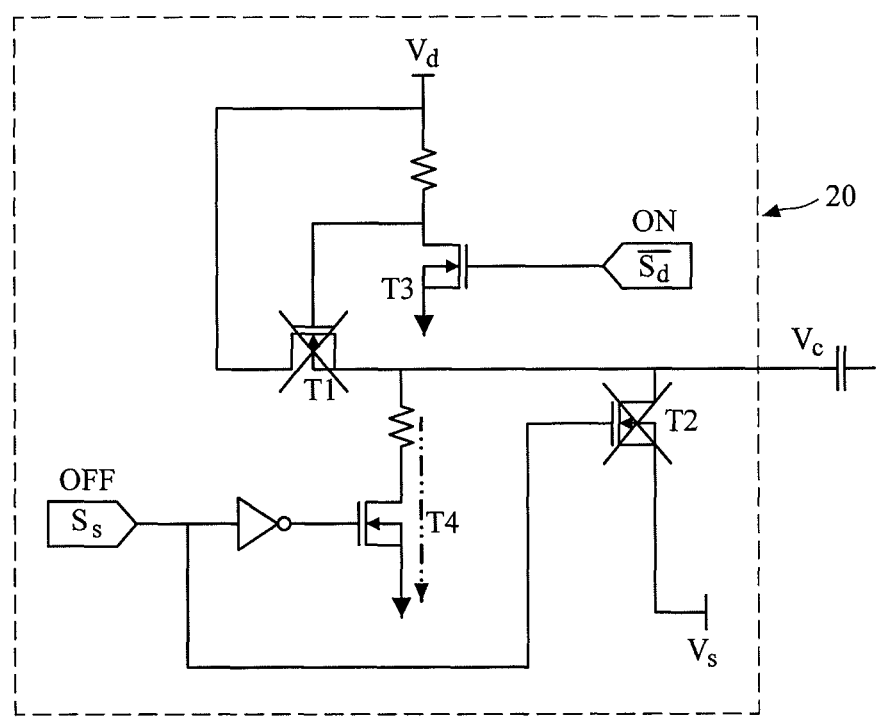

FIGS. 12A through 12D illustrate examples of the operation of the driving device 20 illustrated in FIG. 11. More specifically, FIG. 12A illustrates an example of applying the sensing voltage $V_s$ to the driving electrodes (as indicated by the dotted circuit A of FIG. 7), FIG. FIG. 12B illustrates an example of applying the subtracted voltage ($V_d$–$V_s$) to the driving electrodes (as indicated by the dotted circuit B of FIG. 7), FIG. 12C illustrates an example of applying the driving voltage $V_d$ to the driving electrodes (as indicated by the dotted circuit C of FIG. 7), and FIG. 12D illustrates an example of applying a zero voltage to the driving electrodes (as indicated by the dotted circuit D of FIG. 7).

Referring to FIG. 12A, in some cases the driving device 20 may apply only the sensing voltage $V_s$ to the driving electrodes via the second transistor T2. In the example illustrated in FIG. 12A, the first transistor T1 may be turned off, and the second transistor T2 may be turned on. To turn off the first transistor T1, the gate G1 of the first transistor T1 may be grounded. To ground the gate G1 of the first transistor T1, the third transistor T3 may be turned on. To turn on the third transistor T3 in a case in which the driving voltage $V_d$ is not applied to the driving electrodes, a gate voltage may be applied to the gate G3 of the third transistor T3 to turn on the third transistor T3. To apply the gate voltage to the gate G3 of the third transistor T3, the driving selection signal $\overline{S_d}$ that has the opposite logic value to that of the driving selection signal $S_d$ may be applied to the gate G3 of the third transistor T3. To turn on the second transistor T2, the sensing selection signal $S_s$ that has the same logic value (i.e., 'ON') as the sensing voltage $V_s$ may be applied to the second transistor T2. Accordingly, the second transistor T2 may be turned on, and the fourth transistor T4 may be turned off.

Referring to FIG. 12B, in another case the driving device 20 may apply the subtracted voltage ($V_d$–$V_s$) to the driving electrodes. In the example illustrated in FIG. 12B, the first and second transistors T1 and T2 may both be turned on. To turn on the first transistor T1, a gate voltage may be applied to the gate G1 of the first transistor T1. To apply the gate voltage to the gate G1 of the first transistor T1, the third transistor T3 may be turned off. To turn off the third transistor T3, the driving selection signal $\overline{S_d}$ that has the opposite logic value to that of the driving selection signal $S_d$ may be applied to the third transistor T3. To turn on the second transistor T2, the sensing selection signal $S_s$ that has the same logic value (i.e., 'ON') as the sensing voltage $V_s$ may be applied to the second transistor T2. Accordingly, the second transistor T2 may be turned on, and the fourth transistor T4 may be turned off.

Referring to FIG. 12C, in another case, the driving device 20 may apply the driving voltage $V_d$ to the driving electrodes. In the example illustrated in FIG. 12C, the first transistor T1 may be turned on, and the second transistor T2 may be turned off. To turn on the first transistor T1, a gate voltage may be applied to the gate G1 of the first transistor T1. To apply the gate voltage to the gate G1 of the first transistor T1, the third transistor T3 may be turned off. To turn off the third transistor T3, the driving selection signal $\overline{S_d}$ that has the opposite logic value to that of the driving selection signal $S_d$ may be applied to the third transistor T3. To turn off the second transistor T2, the sensing selection signal $S_s$ having a logic value 'OFF' may be applied to the second transistor T2. Accordingly, the second transistor T2 may be turned off, and the electric potential of the driving electrodes may be stably maintained at the same level as the driving voltage $V_d$.

Referring to FIG. 12D, in yet another case the driving device 20 may apply neither the driving voltage $V_d$ nor the sensing voltage $V_s$ to the driving electrodes. In the example illustrated in FIG. 12D, the first and second transistors T1 and T2 may both be turned off. To turn off the first transistor T1, the gate G1 of the first transistor T1 may be grounded. To ground the gate G1 of the first transistor T1, the third transistor T3 may be turned on. To turn on the third transistor T3 even in a case in which the driving voltage $V_d$ is not applied, a gate voltage may be applied to the gate G1 of the first transistor T1, and the third transistor T3 may be turned off. To turn off the third transistor T3, the driving selection signal $\overline{S_d}$ that has the opposite logic value to that of the driving selection signal $S_d$ may be applied to the third transistor T3. To turn off the second transistor T2, the sensing selection signal $S_s$ having a logic value 'OFF' may be applied to the second transistor T2. Accordingly, the second transistor T2 may be turned off, and the electric potential of the driving electrodes may be stably maintained at 0V.

Figure 13:
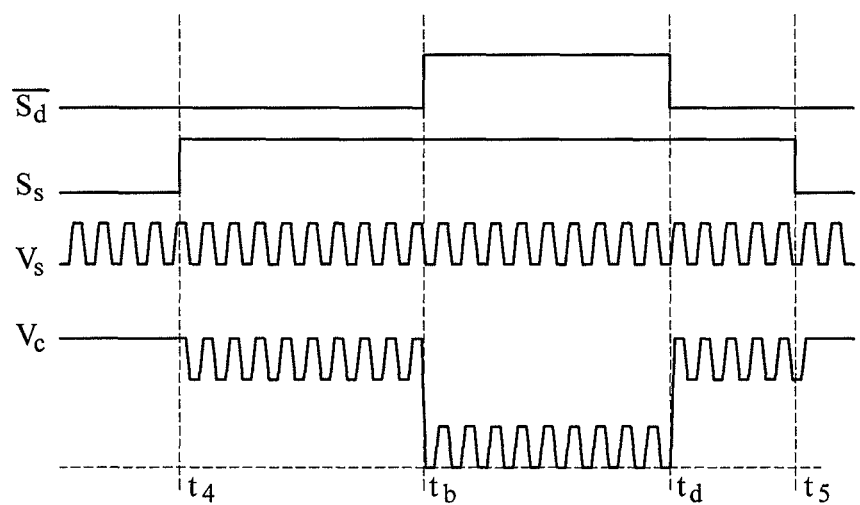
FIG. 13 is a timing chart showing examples of a driving selection signal and a sensing selection signal according to an embodiment.

FIG. 13 is a timing chart showing examples of the driving selection signal $\overline{S_d}$, the sensing selection signal $S_s$, the sensing voltage $V_s$, and the combined signal $V_c$. The timing chart illustrated in FIG. 13 shows an example of providing a clicking sensation, and may be a timing chart of the combined signal $V_c$, that is applied to the driving electrode of the capacitance node at the intersection between the fifth row electrode line R5 and the fifth column electrode line C5 in a time period between $t_4$ and $t_5$ of FIG. 7. Referring to FIG. 13, at a time before $t_4$, the driving selection signal $S_d$ (not shown) may begin to be applied, and the driving selection signal $\overline{S_d}$ has an electric potential of 0V. In response to the sensing selection signal $S_s$ beginning to be applied at $t_4$, the subtracted voltage ($V_d$–$V_s$) may be applied to the capacitance node at the intersection between the fifth row electrode line R5 and the fifth column electrode line C5. In response to the capacitance C of the capacitance node at the intersection between the fifth row electrode line R5 and the fifth column electrode line C5 reaching the reference level $C_{ref}$ at $t_b$, the driving selection signal $S_d$ may be released. At $t_d$, the driving selection signal $S_d$ may be applied again (i.e., the driving selection signal $\overline{S_d}$ has an electric potential of 0V). At some time after $t_d$, the application of the sensing selection signal $S_s$ may be stopped.

As described above, the driving device 20 may include switching devices for turning on or off a high voltage, e.g., high-voltage MOS transistors. Thus, there is no need to use a complicated analog operation (OP) amplifier or a high-voltage multiplexer for subtracting the driving voltage $V_d$ from the sensing voltage $S_d$. In addition, even in a case in which the driving device 20 is implemented as an application specific integrated circuit (ASIC) chip, it is possible to offer stable electrical characteristics. In general, high-voltage transistors have a larger design rule than low-voltage transistors and are difficult to maintain process uniformity. Thus, the application of high-voltage transistors is limited to, for example, high-voltage switches, and are rarely employed in precise analog amplification circuits.

Referring to FIG. 11, the power consumption of the driving device 20 may be reduced by using a low-voltage signal having a voltage of, for example, about 3.3V, as a signal (e.g., the driving selection signal $\overline{S_d}$ and the sensing selection signal $S_s$) for controlling the first through fourth transistors T1 through T4. For example, to minimize the power consumption of the driving device 20, laterally diffused MOS field-effect transistors (LD MOSFETs) may be used as the first through fourth transistors T1 through T4. In this example, a high voltage may be used as a source-drain voltage $V_{ds}$, and a low voltage of, for example, about 5 V or lower, may be used as a gate-source voltage $V_{gs}$.

In response to the first transistor T1 being an N-type LD MOSFET, the source S1 and the drain D1 of the first transistor T1 may be connected as shown in FIG. 11 to maintain the gate-source voltage $V_{gs}$ of the first transistor T1 at 5V or lower. In a case in which the driving voltage $V_d$ (e.g., a high voltage of about 200V) or the subtracted voltage ($V_d$-$V_s$) (e.g., a low voltage of about 5V or lower) is applied to the driving electrode of the capacitance node at the intersection between the fifth row electrode line R5 and the fifth column electrode line C5, as shown in FIGS. 12C and 12B, the gate voltage of the first transistor T1 may correspond to the driving voltage $V_d$. In this case, in response to the first transistor T1 being connected as shown in FIG. 11, the difference between the gate voltage and the source voltage of the first transistor T1 or between the gate voltage of the first transistor T1 and the voltage of the driving electrode of the capacitance node at the intersection between the fifth row electrode line R5 and the fifth column electrode line C5 may become less than 5V. In a case in which only the sensing voltage $V_s$ is applied to the driving electrode of the capacitance node at the intersection between the fifth row electrode line R5 and the fifth column electrode line C5, as shown in FIG. 12A, the gate voltage of the first transistor T1 may become 0V. In this case, in response to the first transistor T1 being connected as shown in FIG. 11, the difference between the gate voltage and the source voltage of the first transistor T1 or between the gate voltage of the first transistor T1 and the voltage of the driving electrode of the capacitance node at the intersection between the fifth row electrode line R5 and the fifth column electrode line C5 may also become less than 5V.

Figure 14:
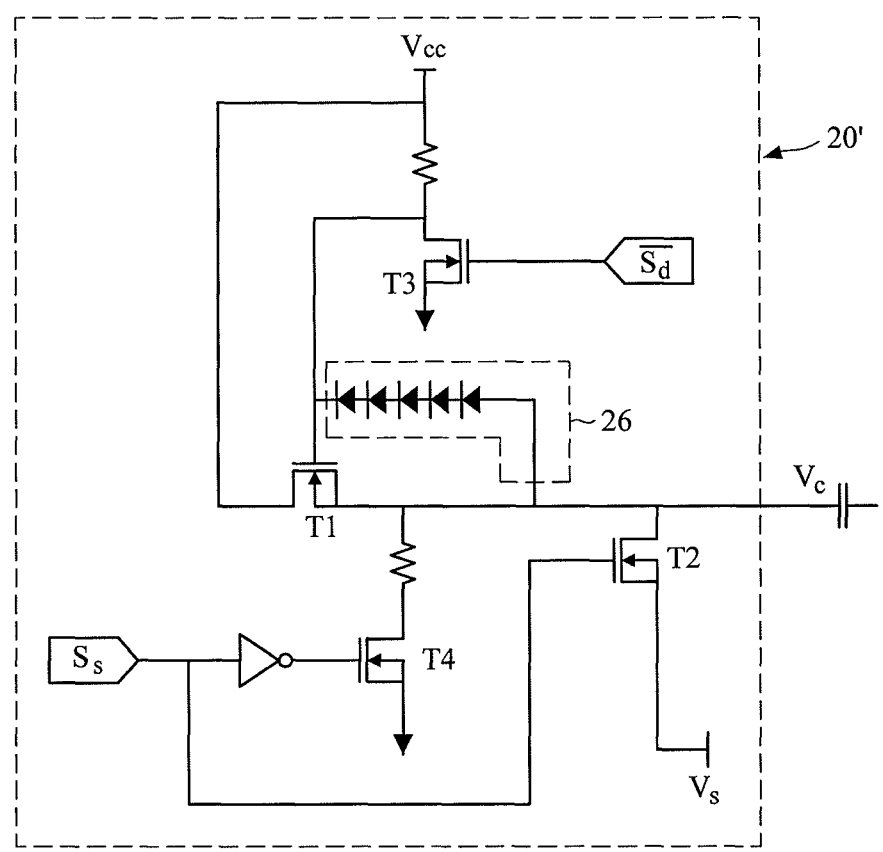
FIG. 14 is a circuit diagram illustrating an example of a driving device according to an embodiment.

FIG. 14 illustrates a variation of the example illustrated in FIG. 11. A driving device 20' illustrated in FIG. 14 is different from the driving device illustrated in FIG. 11 in that it further includes a breakdown prevention element 26 to maintain an electric potential difference $V_{gs}$ between a gate G1 and a source S1 of a first transistor T1. The breakdown prevention element 26 prevents the first transistor T1 from breaking down by maintaining the electric potential difference $V_{gs}$ between the gate G1 and the source S1 of the first transistor T1. The operation of the breakdown prevention element 26 is further described with reference to FIGS. 8 and 13.

As described above with reference to FIGS. 8 and 13, in the touch panel 1 including the driving device 20 illustrated in FIG. 11, the voltage of the driving electrodes may be sharply dropped from a high voltage (e.g., $V_d$ or ($V_-$-$V_s$) to provide a clicking sensation. The controller 50 of the touch panel 1 may control the application of the driving selection signal $S_d$. As a result, the third transistor T3 may be turned on, and the electric potential of the gate G1 of the first transistor T1 may instantly drop to 0V. The speed at which the electric potential of driving electrodes drops may be slower than the speed at which the electric potential of the gate G1 of the first transistor T1 drops due to the electric charges that capacitance nodes corresponding to the driving electrodes are charged with. Accordingly, the potential difference $V_{gs}$ between the gate G1 and the source S1 of the first transistor T1 may sharply increase, and may cause the first transistor T1 to break down. The breakdown prevention element 26 may prevent such a sharp increase in the potential difference $V_{gs}$ between the gate G1 and the source S1 of the first transistor T1.

One or more diodes may be used as the breakdown prevention element 26 to maintain an electric potential between two ports. In a case in which more than one diode is used, the diodes may be connected in series to offer the benefits of using a large-capacity diode. The electric potential maintained by the diodes may be higher than the sensing voltage $V_s$ because, in a case in which the electric potential maintained by the diodes is lower than the sensing voltage $V_s$, the amplitude of the sensing voltage $V_s$ may decrease. The electric potential maintained by the diodes may be lower than the potential difference $V_{gs}$ between the gate G1 and the source S1 of the first transistor T1. The diodes may be configured to prevent a reverse breakdown from occurring in response to the driving voltage $V_d$ being applied to the gate G1 of the first transistor T1.

As described above, it is possible to provide a touch panel that is capable of recognizing a multi-touch input and providing almost the same clicking sensation as that provided by a mechanical keypad by controlling the operation of a driving device. In addition, it is possible to configure a driving device using four transistors and thus to realize a driving device that has a simple structure and can be employed in a small area.

A number of exemplary embodiments have been described above. Nevertheless, it should be understood that various modifications may be made to the described embodiments. For example, suitable results may be achieved if the described techniques are performed in a different order and/or if components in a described system, architecture, device, or circuit are combined in a different manner and/or replaced or supplemented by other components or their equivalents. Accordingly, other implementations are within the scope of the following claims.

What is claimed is:

1. A driving device for a touch panel including at least one capacitance node, the driving device comprising:
    a first switching element that is coupled to a first electrode of the at least one capacitance node and is configured to selectively apply, to the first electrode, a driving voltage for generating an electric potential difference in the at least one capacitance node; and
    a second switching element that is coupled to the first electrode and is configured to selectively apply, to the first electrode, a sensing voltage for sensing a variation in the capacitance of the at least one capacitance node,
    wherein at least one of the driving voltage, the sensing voltage, a voltage lower than the driving voltage, and a combination voltage obtained by subtracting the sensing voltage from the driving voltage or by adding the sensing voltage to the driving voltage is applied to the first electrode according to a combination of a driving selection signal for turning on or off the first switching element and a sensing selection signal for turning on or off the second switching element.

2. The driving device of claim 1, wherein:
    first switching element comprises an output port,
    the second switching element comprises an output port, and
    the driving voltage is a high voltage of about 50V or higher, the sensing voltage is a low voltage of about 5V or lower, and the output ports of the first and second switching elements are connected in parallel to the first electrode.

3. A driving device for a touch panel including at least one capacitance node, the driving device comprising:
a first switching element that is coupled to a first electrode of the at least one capacitance node and is configured to selectively apply, to the first electrode, a driving voltage for generating an electric potential difference in the at least one capacitance node; and
a second switching element that is coupled to the first electrode and is configured to selectively apply, to the first electrode, a sensing voltage for sensing a variation in the capacitance of the at least one capacitance node,
wherein:
the first switching element comprises a first transistor that has a source coupled to a driving voltage source and a drain coupled to the first electrode, the first transistor being turned on or off according to whether the driving selection signal is applied, the driving voltage source generating the driving voltage, and
the second switching element comprises a second transistor that has a source coupled to a sensing voltage source and a drain coupled to the first electrode, the second transistor being turned on or off according to whether the sensing selection signal is applied, the sensing voltage source generating the sensing voltage.

4. The driving device of claim 3, further comprising a third transistor configured to turn off the first transistor in response to the driving selection signal being applied, and to turn on the first transistor in response to the driving selection signal not being applied.

5. The driving device of claim 4, further comprising a fourth transistor configured to be turned on in response to the second transistor being turned off, to be turned off in response to the second transistor being turned on, and to maintain a bias of the first electrode while the second transistor is turned off.

6. The driving device of claim 5, wherein:
the second transistor is turned on in response to the sensing selection signal being applied thereto and is turned off in response to the sensing selection signal not being applied thereto, and
the fourth transistor applies the driving voltage to the first electrode in response to the sensing selection signal not being applied to the fourth transistor and applies the subtracted voltage to the first electrode in response to the sensing selection signal being applied to the fourth transistor.

7. The driving device of claim 5, wherein the first through fourth transistors are high-voltage metal-oxide-semiconductor (MOS) transistors.

8. The driving device of claim 5, wherein the first through fourth transistors are laterally diffused MOS field-effect transistors (LD MOSFETs).

9. The driving device of claim 7, further comprising a breakdown prevention element configured to be coupled to the gate and the source of the first transistor.

10. The driving device of claim 9, wherein the breakdown prevention element comprises a diode and a capacity of the diode is greater than the sensing voltage and less than a breakdown voltage between the gate and the source of the first transistor.

11. A touch panel comprising:
a first substrate;
a plurality of first electrode lines that are disposed on the first substrate and extend in parallel in a first direction;
a second substrate that is spaced apart from the first substrate by a distance;
a plurality of second electrode lines that are disposed on the second substrate and extend in parallel in a second direction that is perpendicular to the first direction;
an electrorheological fluid that is interposed between the first and second substrates;
a driving device configured to apply, to the first electrode lines, a combined signal obtained by combining a driving voltage for varying a viscosity of the electrorheological fluid with a sensing voltage; and
a sensing device that is connected to the second electrode lines and is configured to detect an input to the touch panel in response to the sensing voltage being applied to the first electrode lines,
wherein the driving device comprises:
a first switching element configured to selectively apply the driving voltage to the first electrode lines and a second switching element configured to selectively apply the sensing voltage to the first electrode lines, and
a controller configured to transmit a combination of a driving selection signal for turning on or off the first switching element and a sensing selection signal for turning on or off the second switching element to the driving device,
wherein the driving device selectively applies, to the first electrode lines, at least one of the driving voltage, the sensing voltage, a voltage lower than the driving voltage, and a combination voltage obtained by subtracting the sensing voltage from the driving voltage or by adding the sensing voltage to the driving voltage based on the combination of the driving selection signal and the sensing selection signal from the controller.

12. The touch panel of claim 11, wherein the touch panel comprises a plurality of driving devices that correspond to the first electrode lines and are configured to be respectively connected to the first electrode lines.

13. The touch panel of claim 11, wherein the controller is further configured to, in response to an input signal being received from the sensing device, select the driving selection signal and transmit the driving selection signal to the driving device to release the driving voltage from the first electrode lines.

14. The touch panel of claim 11, wherein the controller is further configured to select the sensing selection signal, and transmit the sensing selection signal to the driving device so that the sensing voltage is sequentially applied to the first electrode lines.

15. A touch panel comprising:
a first substrate;
a plurality of first electrode lines that are disposed on the first substrate and extend in parallel in a first direction;
a second substrate that is spaced apart from the first substrate by a distance;
a plurality of second electrode lines that are disposed on the second substrate and extend in parallel in a second direction that is perpendicular to the first direction;
an electrorheological fluid that is interposed between the first and second substrates;
a driving device configured to apply, to the first electrode lines, a combined signal obtained by combining a driving voltage for varying a viscosity of the electrorheological fluid with a sensing voltage;
a sensing device that is connected to the second electrode lines and is configured to detect an input to the touch panel in response to the sensing voltage being applied to the first electrode lines, wherein the driving device comprises a first switching element configured to selectively apply the driving voltage to the first electrode lines and a second switching element configured to selectively apply the sensing voltage to the first electrode lines, the first switching element comprises a first transistor that has a source coupled to a driving voltage source and a drain coupled to the first electrode lines, the first transistor being turned on or off according to whether the driving selection signal is applied thereto, and the second switching element comprises a second transistor that has a source coupled to a sensing voltage source and a drain coupled to the first electrode lines, is the second transistor being turned on or off according to whether the sensing selection signal is applied thereto.

16. The touch panel of claim 15, wherein the driving device further comprises a third transistor configured to turn off the first transistor in response to the driving selection signal being applied to the third transistor, and to turn on the first transistor in response to the driving selection signal not being applied to the third transistor.

17. The touch panel of claim 16, wherein the driving device further comprises a fourth transistor configured to be turned on in response to the second transistor being turned off, to be turned off in response to the second transistor being turned on, and to maintain a bias of the first electrode lines while the second transistor is turned off.

18. A capacitive-type touch panel comprising:
a first substrate;
a first electrode that is disposed on the first substrate;
a second substrate that is spaced apart from the first substrate;
a second electrode that is disposed on the second substrate, the second electrode and the first electrode forming a capacitance node;
an electrorheological fluid that is interposed between the first and second substrates;
a driving device that is coupled to the first electrode and is configured to apply to the first electrode, a driving voltage, a sensing voltage, a voltage lower than the driving voltage, or a combination of the driving voltage and sensing voltage;
a sensing device that is coupled to the second electrode and is configured to detect an input at the capacitance node in response to the sensing voltage being applied to the first electrode; and
a controller that is configured to transmit a control signal comprising a combination of a driving selection signal for turning on or off a first switching element and a sensing selection signal for turning on or off a second switching element to the driving device,
wherein the driving device selectively applies, to the first electrode, based on the control signal from the controller, the driving voltage, the sensing voltage, the voltage lower than the driving voltage, or the combination of the driving voltage and the sensing voltage, the combination being generated by subtracting the sensing voltage from the driving voltage or by adding the sensing voltage to the driving voltage.

* * * * *